United States Patent [19]
Shinozaki et al.

[11] Patent Number: 5,889,955
[45] Date of Patent: Mar. 30, 1999

[54] NETWORK SYSTEM

[75] Inventors: Mamoru Shinozaki; Kouichi Yamada, both of Tokyo, Japan

[73] Assignee: Mitsubishi Denki Kabushiki Kaisha, Tokyo, Japan

[21] Appl. No.: 726,998

[22] Filed: Oct. 7, 1996

[30] Foreign Application Priority Data

Nov. 14, 1995 [JP] Japan .................................. 7-295526

[51] Int. Cl.⁶ .............................................. G06F 15/177
[52] U.S. Cl. ..................................................... 395/200.54
[58] Field of Search ........................ 395/200.54, 200.55, 395/200.59; 707/10; 364/468.01, 468.15

[56] References Cited

U.S. PATENT DOCUMENTS

| | | | |
|---|---|---|---|
| 4,545,011 | 10/1985 | Lyon et al. .............................. | 364/200 |
| 4,849,879 | 7/1989 | Chinnaswamy et al. ................ | 364/200 |
| 4,930,093 | 5/1990 | Houser et al. ....................... | 364/551.01 |
| 4,953,096 | 8/1990 | Wachi et al. ............................ | 364/550 |
| 5,021,997 | 6/1991 | Archie et al. ........................... | 364/900 |
| 5,251,152 | 10/1993 | Notess ..................................... | 364/550 |
| 5,459,837 | 10/1995 | Caccavale .......................... | 395/184.01 |
| 5,592,620 | 1/1997 | Chen et al. ......................... | 395/200.01 |
| 5,592,626 | 1/1997 | Papadimitriou et al. .......... | 395/200.09 |
| 5,615,359 | 3/1997 | Yung ....................................... | 395/610 |
| 5,627,766 | 5/1997 | Beaven .............................. | 364/551.01 |
| 5,638,514 | 6/1997 | Yoshida et al. .................... | 395/200.11 |
| 5,664,106 | 9/1997 | Caccavale .......................... | 395/200.54 |
| 5,715,373 | 2/1998 | Desgrousilliers et al. ................ | 395/50 |

*Primary Examiner*—Stuart S. Levy
*Assistant Examiner*—Kenneth W. Fields
*Attorney, Agent, or Firm*—Leydig, Voit & Mayer

[57] ABSTRACT

A network system temporarily stores all data base access commands transmitted from a test server in a command storage section, is in the stand-by state until a data base access command execution time written in one of the data base access commands comes, and reads out the data base access command from the command storage section, when the data base access command execution time has come, for accessing data base servers $1a$ to $1n$, and also the network system temporarily stores all performance evaluation data for the data base servers $1a$ to $1n$ in a performance evaluation data storage section, reads out performance evaluation data from the performance evaluation data storage section when it is determined that execution of all data base access commands has been finished, and transmits the read-out data to the test server.

16 Claims, 22 Drawing Sheets

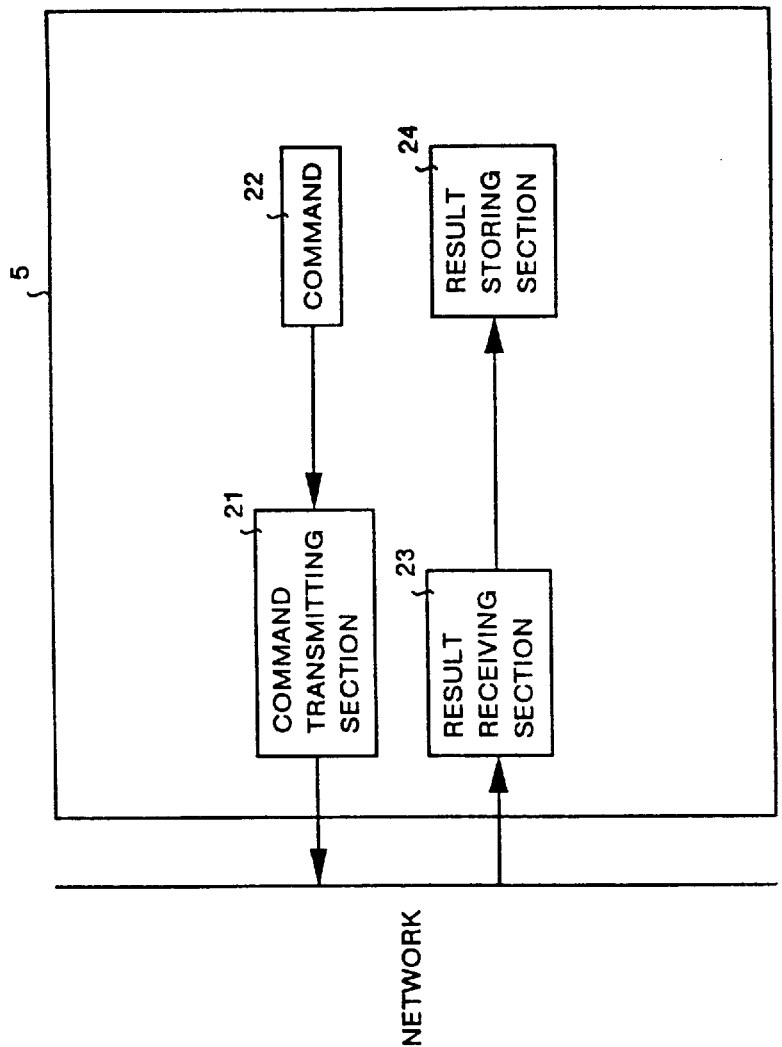

FIG.4A
FIG.4B
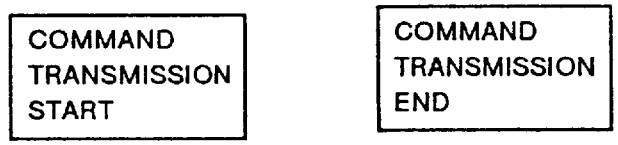
FIG.4C
EXAMPLE: 

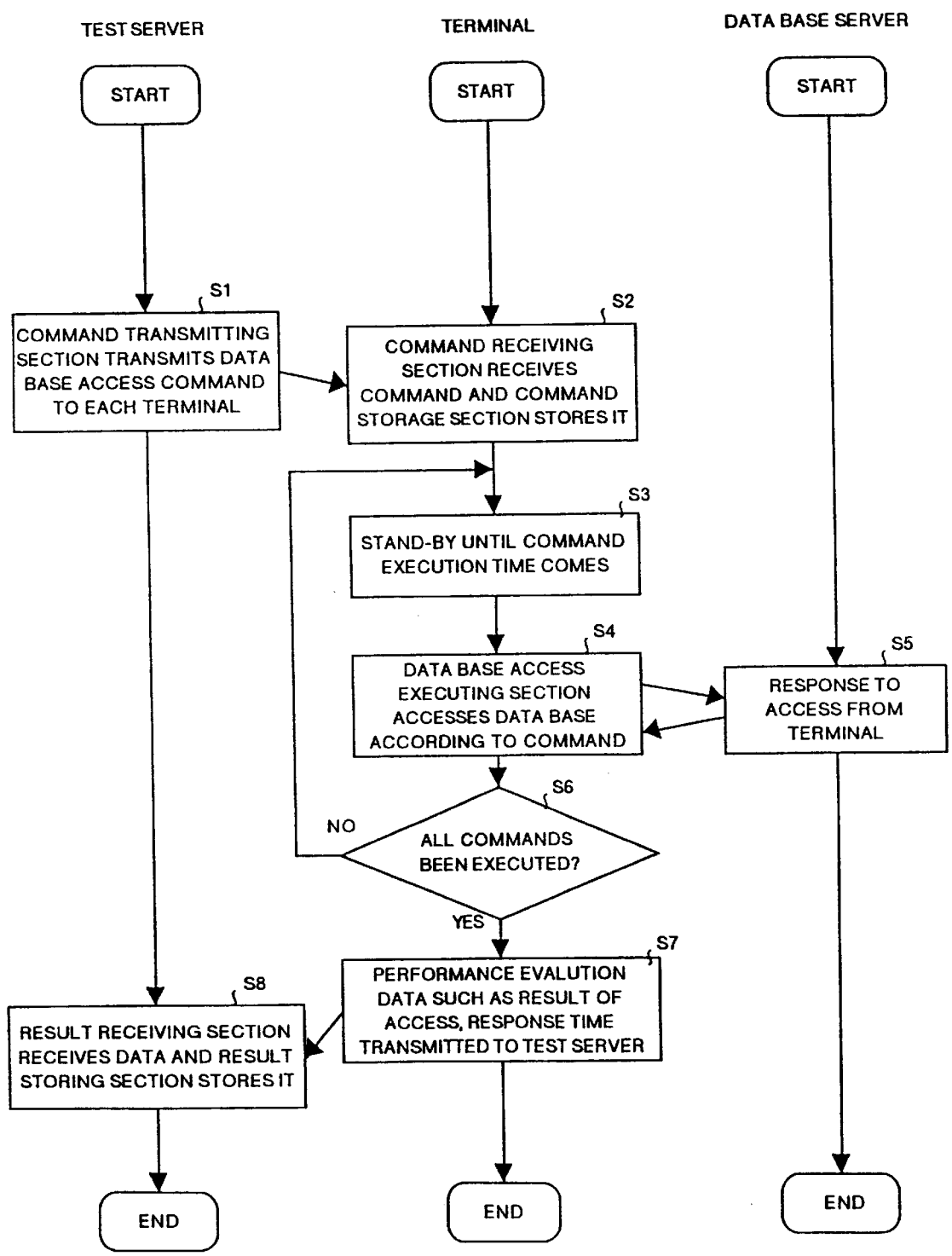

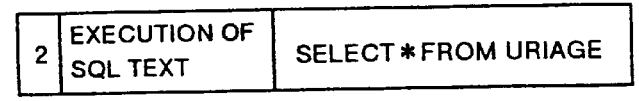
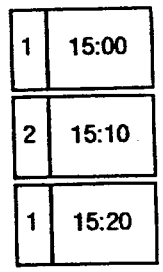

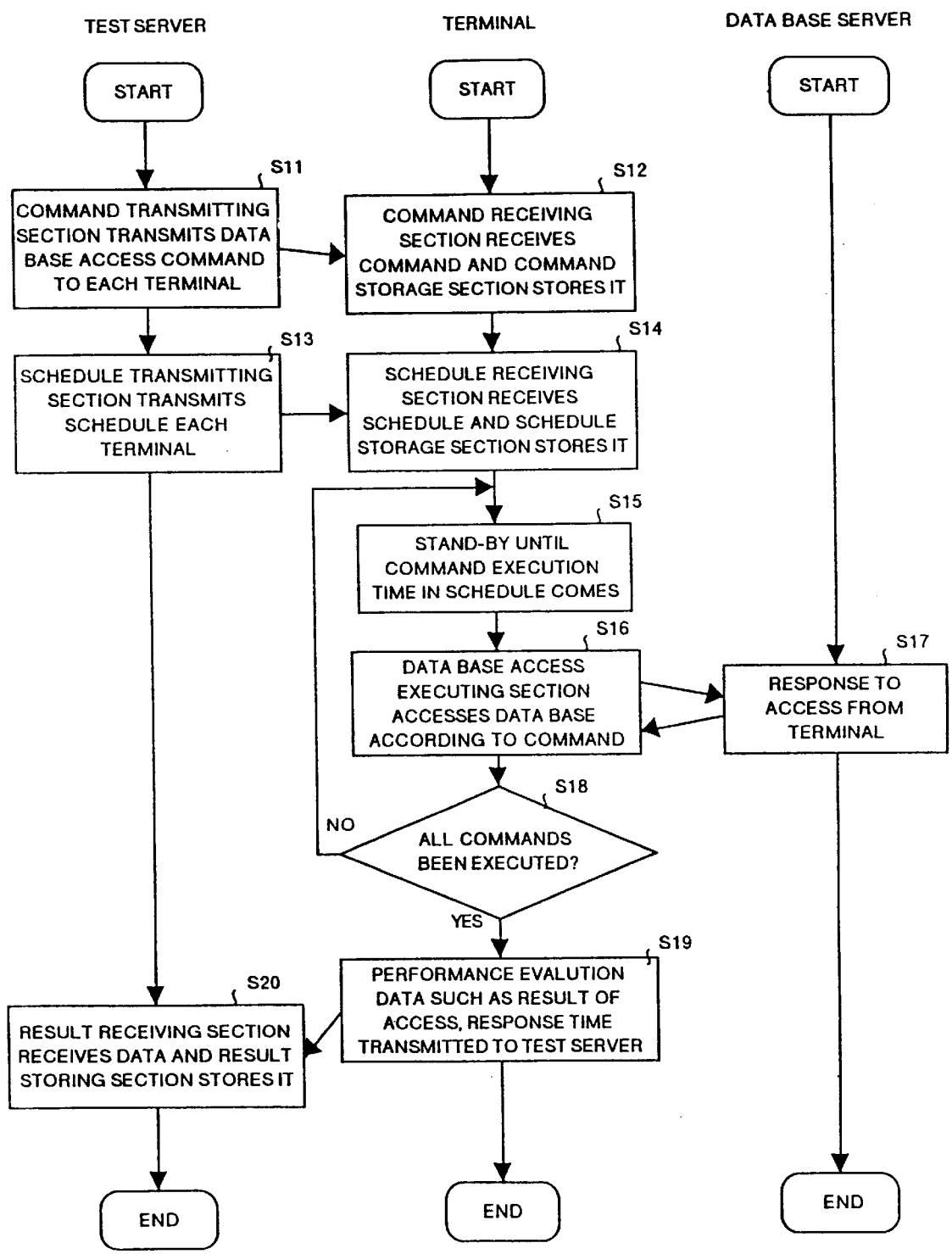

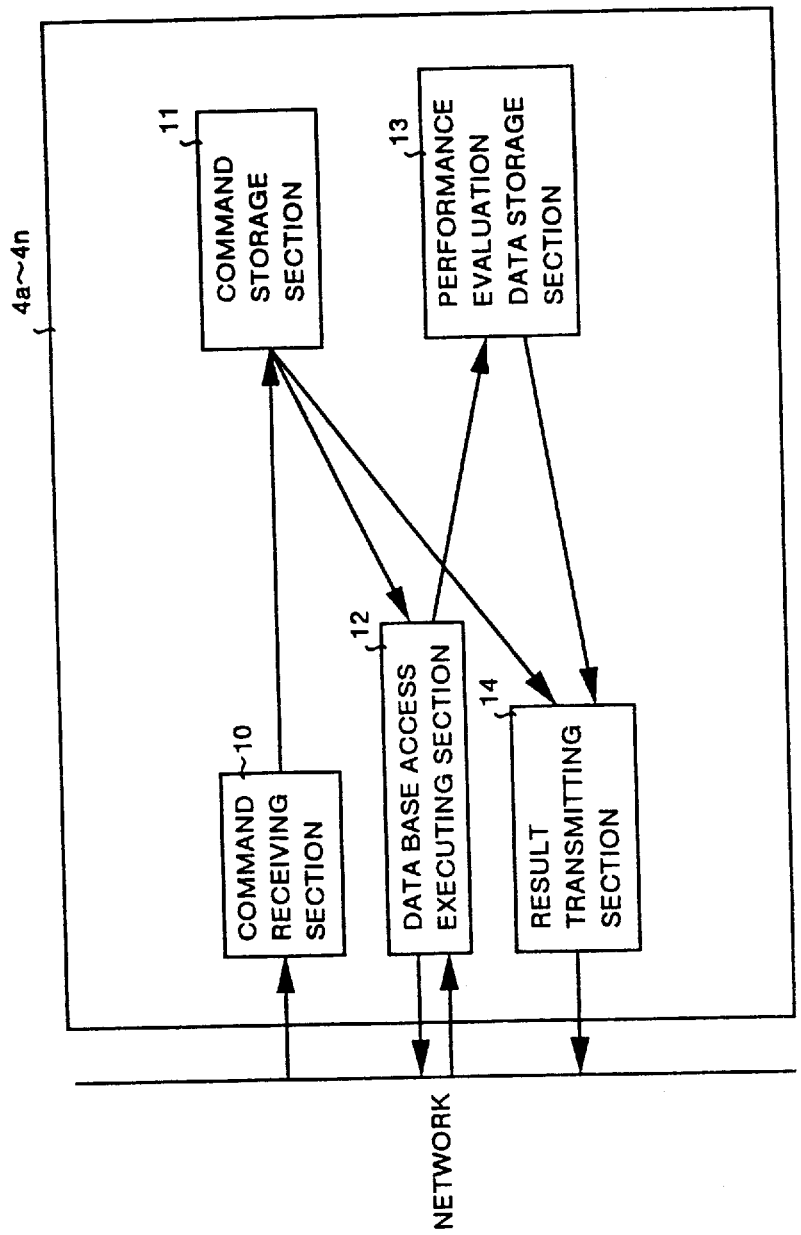

FIG.11A

| COMMAND EXECUTION TIME | DATA BASE ACCESS | COMMAND | PARAMETER |
|---|---|---|---|

FIG.11B

| COMMAND EXECUTION TIME | RESULT TRANSMISSION | DESTINATION OF RESULT TRANSMISION | |
|---|---|---|---|

FIG.11C

EXAMPLE:

COMMAND TRANSMISSION START

| 15:00 | DATA BASE ACCESS | EXECUTION OF SQL TEXT | SELECT * FROM URIAGE |
|---|---|---|---|

| 16:00 | RESULT TRANSMISSION | (NAME OF TEST SERVER) | |
|---|---|---|---|

COMMAND TRANSMISSION END

FIG.20A

| COMMAND EXECUTION TIME(ABSOLUTE TIME) | MEASUREMENT START | | |
|---|---|---|---|

FIG.20B

| COMMAND EXECUTION TIME(RELATIVE TIME) | DATA BASE ACCESS | COMMAND | PARAMETER |
|---|---|---|---|

FIG.20C

| COMMAND TRANSMISSION START |
|---|

| 15:00 | MEASUREMENT START | | |
|---|---|---|---|

| ONE HOUR LATER | DATA BASE ACCESS | EXECUTION OF SQL TEXT | SELECT * FROM URIAGE |
|---|---|---|---|

| COMMAND TRANSMISSION END |
|---|

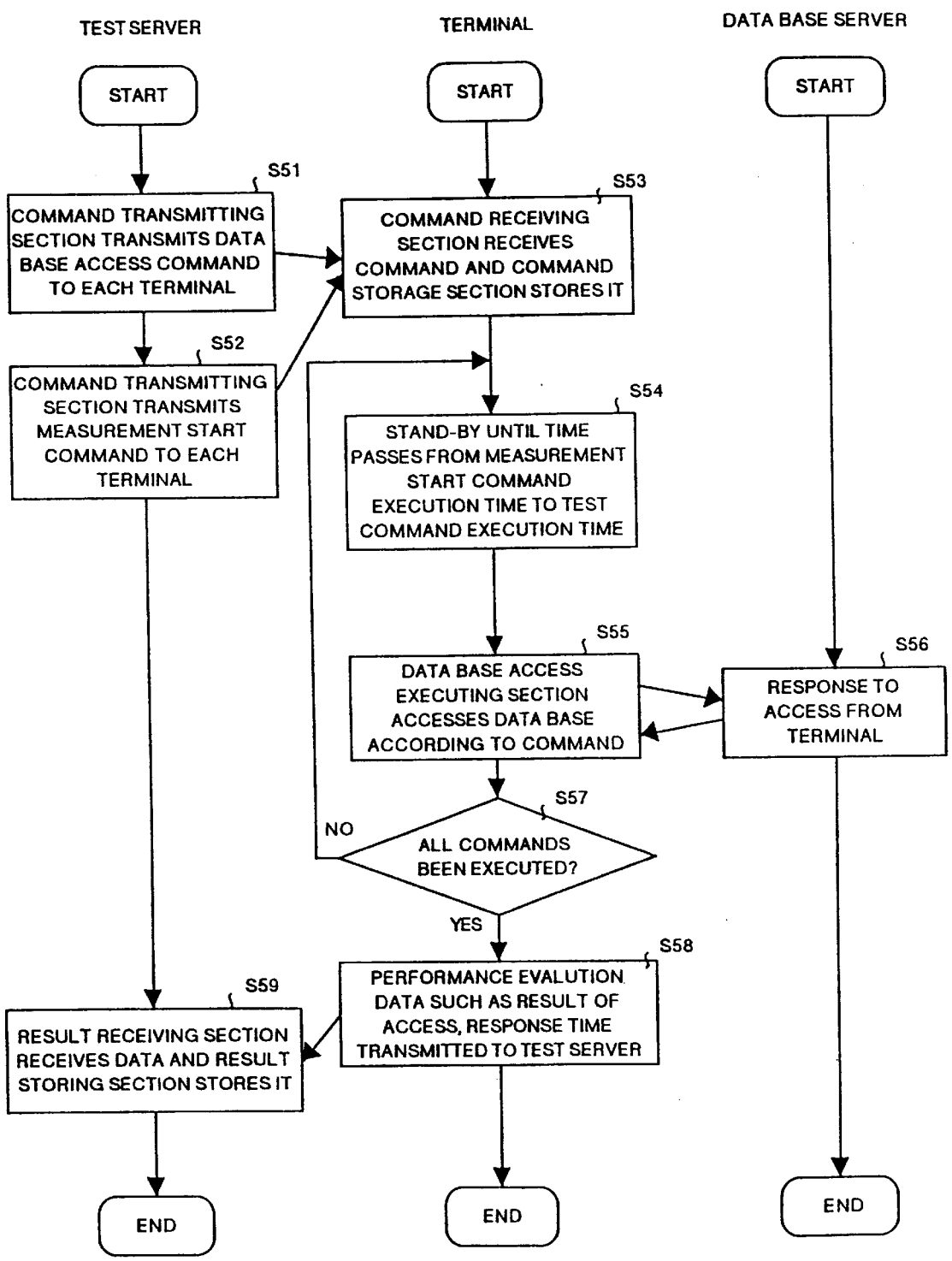

NETWORK SYSTEM

FIELD OF THE INVENTION

The present invention relates to a network system, and more particularly to a network system which can accurately monitor performance evaluation of the network system.

BACKGROUND OF THE INVENTION

In a network system using any network, access to a server is generated from terminals distributed and located at many remote sites. In a case where performance evaluation of servers connected to the terminals distributed and located at many remote sites through a LAN is executed, each of the terminals inputs thereinto a program for performance evaluation of a server which the terminal accesses, runs the program for the performance evaluation of the servers, and collects a result of the response from the server. In this case, it is required for an operator to take the program to each of the terminals and to bring back the result.

In order to solve the problem described above, a method in which an evaluation command is sent to each of the terminals through a network and a result of monitoring is collected is considered. As for the network system based on the conventional technology, for instance, a network OS evaluation system on a local area network was disclosed in Japanese Patent Laid Open Publication No. 177893/1994. Detailed description is made hereinafter for the conventional technology with reference to the related drawings.

FIG. 22 is a block diagram showing configuration of the conventional type of network system. In FIG. 22, designated at the reference numerals 101a to 101m are a plurality of target servers as objects for monitoring, and at 102 a test controller for registering thereto items for testing and evaluating the target servers 101a to 101m as objects for monitoring, generating test commands according to the registered test items, and transmitting the commands to test servers 103a to 103n. The reference numerals 103a to 103n indicate a plurality of test servers for testing a network in relation to the specified target servers 101a to 101m according to the test commands transmitted from the test controller 102, and the reference numeral 104 indicates a test monitor for displaying and recording a result of the test or situations of the test for the target servers 101a to 101m transmitted from the test servers 103a to 103n. The reference numeral 105 indicates a LAN for connecting the target servers 101a to 101m, test controller 102, test servers 103a to 103n, and test monitor 104 to each other.

In the conventional type of network system, a network OS as an object for monitoring is installed in the target servers 101a to 101m. At first, the test controller 102 generates test commands according to items for the test previously registered in the target servers 101a to 101m, and the generated test commands are transmitted to the test servers 103a to 103n.

Then, when the test servers 103a to 103n receive the test commands transmitted from the test controller 102, a specified network test is executed to the specified target servers 101a to 101m according to the received test commands. Also the test servers 103a to 103n periodically transmit test situations executed or a result of the tests for the target servers 101a to 101m, to which network tests were executed, to the test monitor 104.

The test monitor 104, when having received the test situations or the result of the tests executed to the target servers 101a to 101m transmitted from the plurality of test servers 103a to 103n, displays and records the test situations and the result of the tests executed to the target servers 101a to 101m.

In the conventional type of network system, one unit of test controller 102 can uniformly control tests for the target servers 101a to 101m operated by each of the test servers 103a to 103n, so that there is an advantage therein that an operator for monitoring is not required to operate for each of clients respectively.

In the conventional type of network system described above, the object is to monitor and evaluate a network OS as objects for monitoring installed in the target servers 101a to 101m, so that transfer of test commands from the test controller 102 to the test servers 103a to 103n, access from the test servers 103a to 103n to the target servers 101a to 101m by executing tests, and reporting of a result of execution from the test servers 103a to 103n to the test monitor 104 are concurrently executed.

In the conventional type of network system described above, the target servers 101a to 101m, test controller 102, test servers 103a to 103n, and test monitor 104 are directly connected to a LAN 105, so that a transfer rate in the network is sufficiently high. For this reason, even if test command transfer from the test controller 102 to the test servers 103a to 103n, access from the test servers 103a to 103n to the target servers 101a to 101m by executing tests, and reporting of a result of execution from the test servers 103a to 103n to the test monitor 104 are concurrently executed, any problems described later hardly occur.

However, in a case where the target servers 101a to 101m, test controller 102, test servers 103a to 103n, and test monitor 104 are not directly connected only to LAN 105, but are linked to each other by using a wide area network, the data transfer rate in the wide area network is generally low. And for this reason, when transfer of test commands from the test controller 102 to the test servers 103a to 103n, access from the test servers 103a to 103n to the target servers 101a to 101m by executing tests, and reporting of a result of execution from the test servers 103a to 103n to the test monitor 104 are concurrently executed, the data transfer rate becomes lower than that in a case where data is simply transferred from the test servers 103a to 103n to the target servers 101a to 101m, due to an increased data volume being concurrently transferred. Accordingly, in a case where a period of time is measured a period of time from a point of time when access from the test servers 103a to 103n to the target servers 101a to 101m is executed until a point of time when a response comes back therefrom, the data transfer rate during the period of time is measured as lower than the actual rate because also different data flows therethrough concurrently, and for this reason a period of time required to transfer the necessary data can not correctly be obtained.

As described above, since a plurality types of different data flow concurrently, a load applied to the test server as well as to the test controller 102 increases, and for this reason performance of the target servers 101a to 101m can not correctly be monitored.

SUMMARY OF THE INVENTION

It is an object of the present invention to provide a network system in which it is possible to accurately evaluate performance without applying a load other than test commands to a terminal as well as to a network during evaluation of the performance.

The network system according to the present invention to which connected are a plurality of servers as objects for monitoring, a plurality of terminals which access and monitor performance of the servers as objects for monitoring, and a test server for transmitting commands for testing the servers as objects for monitoring to the terminals is characterized in that the test server comprises a command transmitting means for transmitting a data base access command, in which a data base access command execution time is written, to the terminals, a performance evaluation data receiving means for receiving performance evaluation data for the servers as objects for monitoring transmitted from the terminals, and a first performance evaluation data storage means for storing therein the received performance evaluation data; that each of the terminals comprises a command receiving means for receiving the data base access command transmitted from the test server, a command storage means for storing the received data base access command, an access executing means for reading out a data base access command from the command storage means according to a data base access command execution time written in the data base access command and transmitting the read-out data base access command to and accessing the servers as objects for monitoring, an access result receiving means for receiving a result of access corresponding to the data base access command transmitted from the servers as objects for monitoring, a response time measuring means for measuring a response time from a point of time when the data base access command is transmitted to the servers as objects for monitoring until a point of time when a result of access transmitted from the servers as objects for monitoring is received, a second performance evaluation data storage means for storing therein performance evaluation data including therein a result of access received by the access result receiving means and a response time measured by the response time measuring means, a command execution end determining means for determining whether execution of all data base access commands has been finished or not, and a performance evaluation data transmitting means for reading out performance evaluation data from the second performance data storage means when it is determined that execution of all data base access commands has been finished and transmitting the read-out data to the test server; and that each of the servers as objects for monitoring has an access result transmitting means for transmitting a result of access corresponding to the data base access command transmitted from the terminals to the terminals.

The network system according to the present invention to which connected are a plurality of servers as objects for monitoring, a plurality of terminals which access and monitor performance of the servers as objects for monitoring, and a test server for transmitting commands for testing the servers as objects for monitoring to the terminals is characterized in that the test server comprises a command transmitting means for transmitting a data base access command for the servers as objects for monitoring to the terminals, a schedule transmitting means for transmitting a schedule in which a data base access command execution time is written, a performance evaluation data receiving means for receiving performance evaluation data for the servers as objects for monitoring transmitted from the terminals, and a first performance evaluation data storage means for storing therein the received performance evaluation data; that each of the terminals comprises a command receiving means for receiving the data base access command transmitted from the test server, a command storage means for storing the received data base access command, a schedule receiving means for receiving a schedule transmitted from the test server, a schedule storage means for storing the received schedule, an access executing means for reading out a data base access command from the command storage means according to a data base access command execution time written in the schedule and transmitting the read data base access command to and accessing the servers as objects for monitoring, an access result receiving means for receiving a result of access corresponding to the data base access command transmitted from the servers as objects for monitoring, a response time measuring means for measuring a response time from a point of time when the data base access command is transmitted to the servers as objects for monitoring until a point of time when a result of access transmitted from the servers as objects for monitoring is received, a second performance evaluation data storage means for storing therein performance evaluation data including a result of access received by the access result receiving means and a response time measured by the response time measuring means, a command execution end determining means for determining whether execution of all data base access commands is finished or not, and a performance evaluation data transmitting means for reading the performance evaluation data from the second performance data storage means and transmitting the performance evaluation data to the test server when it is determined that execution of all data base access commands has been finished; and that each of the servers as objects for monitoring has an access result transmitting means for transmitting a result of access corresponding to the data base access command transmitted from the terminals to the terminals.

In the network system described above, the command transmitting means in the test server transmits a performance evaluation data transmission command in which a performance evaluation data transmission command execution time is written to the terminals; the command receiving means in the terminal receives the performance evaluation data transmission command transmitted from the test server; the command storage means stores therein the received performance evaluation data transmission command; and the performance evaluation data transmitting means in the terminals reads out the performance evaluation data from the second performance evaluation data storage means according to the performance evaluation data transmission command execution time written in the performance evaluation data transmission command after it is determined that execution of all data base access commands has been finished and transmits the performance evaluation data to the test server.

In the network system described above, the test server comprises a terminal communication means for making communications with the terminals, a response time measuring means for measuring a response time from a point of time when a message is transmitted to the terminal until a point of time when a response is returned from the terminal, a time setting command transmitting means for transmitting a time setting command to the terminals according to the measured response time; and the terminal comprises a real time responding means for immediately returning a response in response to transmission from the test server to the test server, a time setting command receiving means for receiving the time setting command transmitted from the test server, and a time setting means for setting time for the terminals according to the received time setting command.

In the network system described above, the test server comprises a program transmitting means for transmitting a new data base access program for switching a data base access program in the terminals to the terminals; and each of terminals comprises a program receiving means for receiving a new data base access program transmitted from the test server, and a program changing means for switching a data base access program in each of the terminals to the received new data base access program.

In the network system described above, the command transmitting means in the test server transmits a measurement start command, in which a measurement start command execution time is written, to the terminals; the command receiving means in the terminals receives the measurement start command transmitted from the test server; the command storage means stores therein the received measurement start command; and the access executing means reads out a data base access command from the command storage means according to the data base access command execution time written in the data base access command measured according to the measurement start command execution time as a reference and transmits the data base access command to the servers as objects for monitoring for accessing.

The network system described above comprises a connecting means for insuring connection from the terminals to the test server in a case where communication between the test server and the terminals is executed.

The network system described above comprises a connection control means for insuring connection during communication and disconnecting the communication while communication is not executed in a case where communication between the test server and the terminals is executed.

Other objects and features of this invention will become understood from the following description with reference to the accompanying drawings.

BRIEF DESCRIPTION OF THE DRAWINGS

FIG. 3 is a block diagram showing configuration of a test server shown in FIG. 1;

FIGS. 4A to 4C are views showing a format of a test command shown in FIG. 3;

FIG. 5 is a flow chart showing a processing flow of the network system shown in FIG. 1;

FIG. 9 is a flow chart showing a flow of processing of a network system in Embodiment 2 of the present invention;

FIG. 10 is a block diagram showing configuration of a terminal in Embodiment 3 of the present invention;

FIGS. 11A to 11C are views showing a format of a data base access command as well as that of a performance evaluation data transmission command in Embodiment 3 of the present invention;

FIGS. 20A to 20C are views showing formats each for a measurement start command and a data base access command in Embodiment 6 of the present invention;

FIG. 21 is a flow chart showing a flow of processing of a network system in Embodiment 6 of the present invention.

DESCRIPTION OF THE PREFERRED EMBODIMENTS

Description is made hereinafter for embodiments of the present invention with reference to the related drawings.

Figure 1:
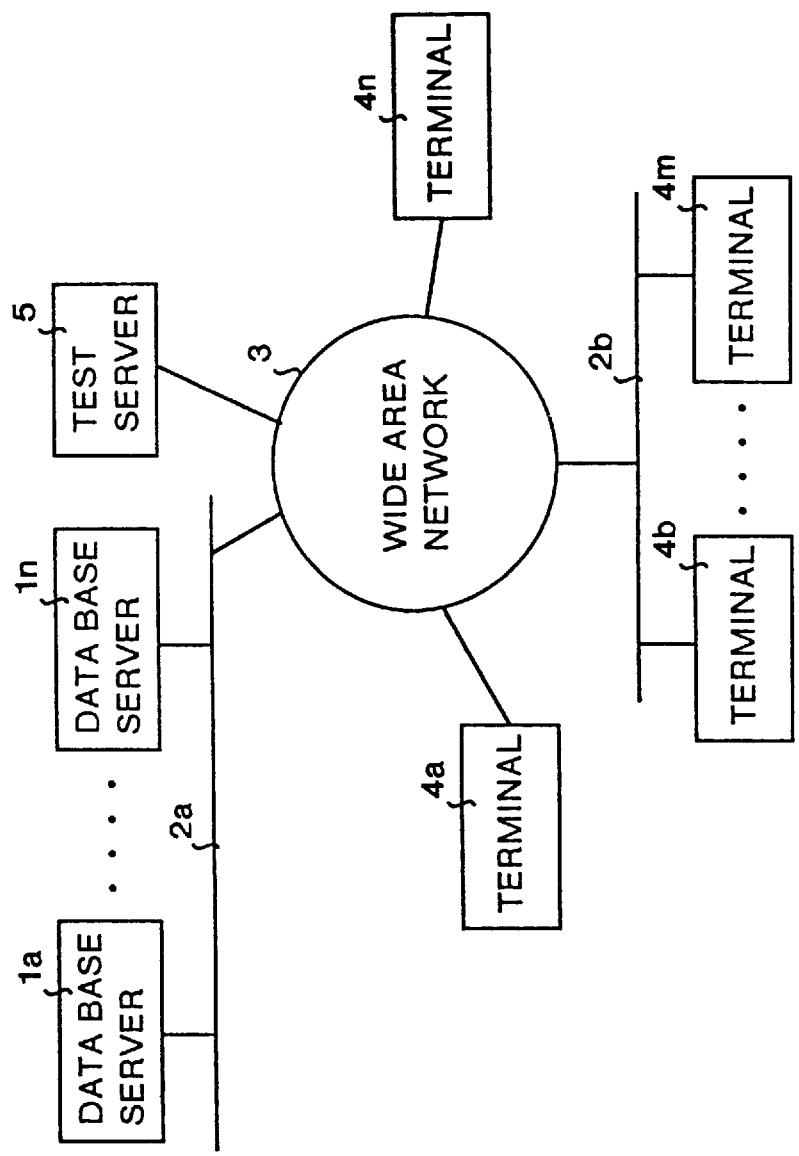
FIG. 1 is a block diagram showing configuration of a network system in Embodiment 1 of the present invention.

FIG. 1 is a block diagram showing configuration of a network system in Embodiment 1 of the present invention.

In FIG. 1, designated at the reference numerals $1a$ to $1n$ are a plurality of data base servers as objects for monitoring each connected to a wide area network 3 through a LAN $2a$, and at $4a$ to $4n$ a plurality of terminals for accessing data base servers $1a$ to $1n$ and monitoring performance of the data base servers $1a$ to $1n$. The terminals $4a$ and $4n$ are directly connected to the wide area network 3, and the terminal $4b$ and $4m$ are connected to the wide area network 3 through a LAN $2b$ which is different from the LAN $2a$. The reference numeral 5 indicates a test server for transmitting a command for testing the data base servers $1a$ to $1n$ to the terminals $4a$ to $4n$. The network system in the embodiment comprises a plurality of data base servers $1a$ to $1n$, a test server 5, and a plurality of terminals $4a$ to $4n$, each connected to the wide area network 3. It should be noted that each of the terminals $4a$ to $4n$, and each of the servers $1a$ to in and 5 may directly be connected to the wide area network 3, or may be connected thereto through a router. Also the terminals $4b$ to $4m$ may be connected to the LAN $2a$ to which the data base servers $1a$ to $1n$ are also connected, the data base servers $1a$ to $1n$ may be connected to the LAN $2b$ to which the terminals $2b$ to $2m$ are also connected, and the test server 5 may be connected to the LAN $2a$ or to LAN $2b$. In other words, data base servers and terminals may be present on the same LAN or may be present on the different LAN, or may be even on both of the LANs. The cases described above are the same as those in embodiments described later.

Figure 2:
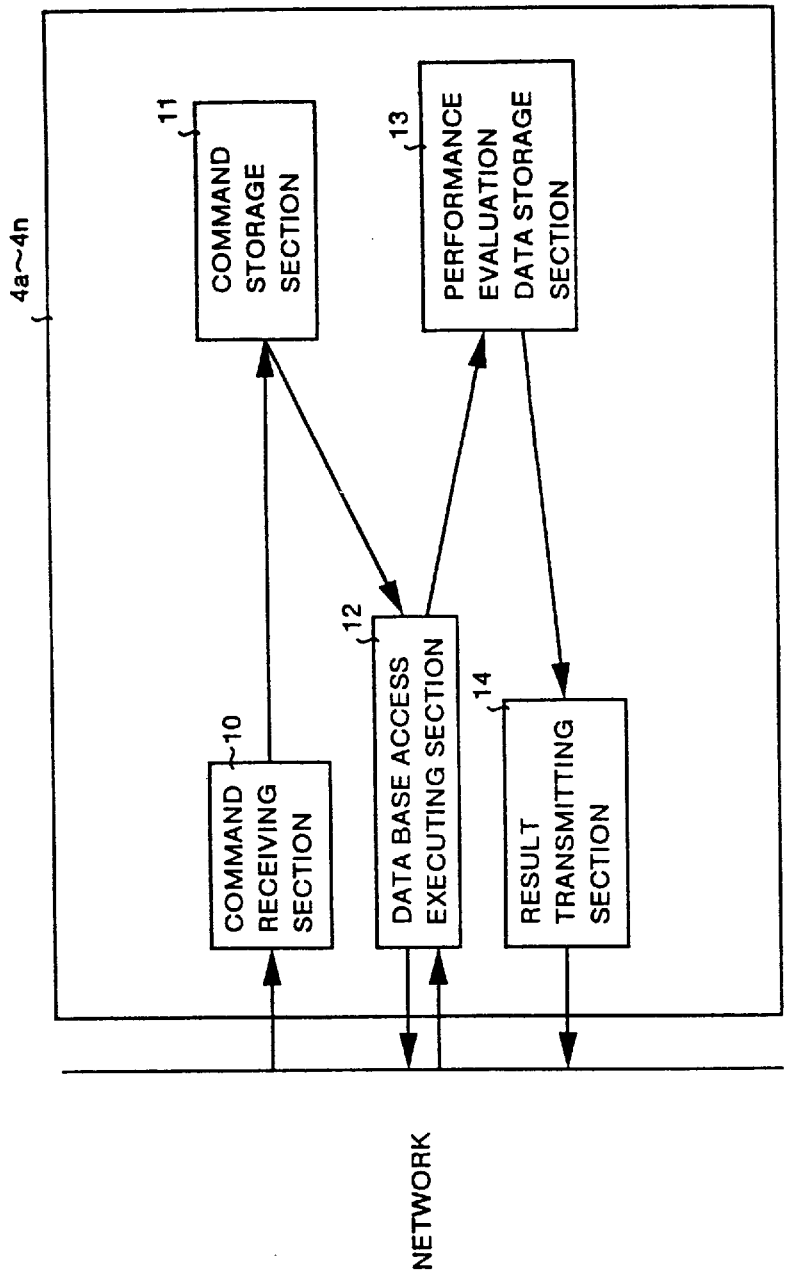
FIG. 2 is a block diagram showing configuration of one of terminals shown in FIG. 1.

FIG. 2 is a block diagram showing configuration of a terminal shown in FIG. 1.

In FIG. 2, designated at the reference numeral 10 is a command receiving section for receiving a data base access command in which a data base access command execution time transmitted from the test server 5 is written, at 11 a command storage section for storing therein the received data base access command. The reference numeral 12 indicates a data base access executing section for reading out a data base access command from the command storage section 11 according to a data base access command execution time in the data base access command, transmitting the read-out data base access command to the data base server $1a$ to $1n$ for accessing, receiving a result of access corresponding to the data base access command transmitted from the data base server 1a to 1n, and measuring a response time from a point of time when a data base access command is transmitted to the data base servers 1a to 1n until a point of time when a result of access transmitted from the data base servers 1a to 1n is received. The reference numeral 13 indicates a performance evaluation data storage section for storing therein performance evaluation data including a result of access received and a response time measured each by the data base access executing section 12, and the reference numeral 14 indicates a result transmitting section for reading out a performance evaluation data from the performance evaluation data storage section 13 when it is determined that execution of all data base access commands has been finished and transmitting the read-out data to the test server 5. It should be noted that the data base servers 1a to 1n are so constructed that a result of access corresponding to data base access commands transmitted from the terminals 4a to 4n is transmitted to the terminals 4a to 4n.

FIG. 3 is a block diagram showing configuration of the test server shown in FIG. 1.

In FIG. 3, designated at the reference numeral 21 is a command transmitting section for transmitting a data base access command 22, in which a data base access command execution time for testing the data base servers 1a to 1n is written, to the terminals 4a to 4n, at 23 a result receiving section for receiving performance evaluation data for the data base servers 1a to 1n transmitted from the terminals 4a to 4n, and at 24 a result storing section for storing the received performance evaluation data.

FIGS. 4A to 4C are views showing a format of the data base access command shown in FIG. 3.

Written in the data base access command 22 are, as shown in FIG. 4A, a command execution time (a data base access command execution time), a command (a data base access command), and parameters. When the command transmitting section 21 in the test server 5 transmits a data base access command 22 to the terminals 4a to 4n, as shown in FIG. 4B, commands indicating start and end of command transmission are transmitted to the terminals 4a to 4n apart from the command itself. For instance, as shown in FIG. 4C, the command transmitting section 21 in the test server 5 transmits, at first, a command transmission start command to the terminals 4a to 4n, transmits an actual command (15:00 Execution of SQL text SELECT*FROM URIAGE), and finally transmits a command transmission end command to the terminals 4a to 4n. Each of the terminals 4a to 4n stores in the command storage section 11 commands transmitted during a period of time from a point of time when the command transmission start command is received until the point of time when a command transmission end command is received.

FIG. 5 is a flow chart showing a flow of processing of the network system shown in FIG. 1.

At first, the test server 5, data base servers 1a to 1n, and terminals 4a to 4n are started up. Then the command transmitting section 21 in the test server 5 transmits a data base access command 22, in which a data base access command execution time for testing the data base servers 1a to 1n is written, to the terminals 4a to 4n (Step S1). The data base access command 22 transmitted to each of the terminals 4a to 4n may be used in common for all the terminals 4a to 4n, or may be different from each other for each of the terminals as required. The command receiving section 10 in the terminals 4a to 4n receives a data base access command 22 transmitted from the test server 5, and the command storage section 11 temporarily stores all the received data base access command 22 (Step S2).

When data base access execution time written in the data base access command 22 has come (Step S3), the data base access executing section 12 reads out a data base access command 22 from the command storage section 11 and transmits the data base access command 22 to the data base servers 1a to 1n according to the read-out data base access command 22 for accessing (Step S4). The data base servers 1a to 1n respond to the access from the terminals 4a to 4n (Step S5), and transmit a result of access corresponding to the data base access command 22 transmitted from the terminals 4a to 4n to the terminals 4a to 4n.

The data base access executing section 12 in the terminals 4a to 4n receives a result of access transmitted from the data base servers 1a to 1n, and measures a response time from a point of time when the data base access command 22 is transmitted to the data base servers 1a to 1n until a point of time when a result of access transmitted from the data base servers 1a to 1n is received. The performance evaluation data storage section 13 stores performance evaluation data for the data base servers 1a to 1n including therein a result of access received and a response time measured by each the data base access executing section 12.

The result transmitting section 14 determines whether the data base access executing section 12 has finished execution of all data base access commands or not (Step S6), and reads out performance evaluation data including a result of access and a response time from the performance evaluation data storage section 13 when it is determined that execution of all data base access commands has been finished, and transmits the read-out data to the test server 5 (Step S7). The data base access executing section 12, when it is determined that execution of all data base access commands has not been finished (Step S6), returns to Step S3, and repeats accessing to data base until all data base access commands is executed. The result receiving section 23 in the test server 5 receives performance evaluation data for the data base servers 1a to 1n transmitted from the terminals 4a to 4n, and the result storing section 24 stores the received performance evaluation data for the data base servers 1a to 1n (Step S8).

As described above, in this embodiment, the network system temporarily stores all data base access commands 22 transmitted from the test server 5 in the command storage section 11, is in the stand-by state until a data base access command execution time written in one of the data base access commands 22 comes, reads out the data base access command 22 from the command storage section 11 when the data base access command execution time written in the data base access command 22 has come, and accesses the data base servers 1a to 1n, and also the network system temporarily stores all performance evaluation data for the data base servers 1a to 1n in the performance evaluation data storage section 13, reads out performance evaluation data from the performance evaluation data storage section 13 when it is determined that execution of all data base access commands has been finished and transmits the read-out data to the test server 5, so that a processing for transmitting the data base access command 22 from the test server 5 to the terminals 4a to 4n, a processing for the terminals 4a to 4n to access the data base servers 1a to 1n, and a processing for the terminals 4a to 4n to transmit performance evaluation data to the test server 5 can discretely be executed without executing two or more of the processings concurrently. For this reason, data transaction between the test server 5 and each of the terminals 4a to 4n and that between the terminals 4a to 4n and the data base servers 1a to 1n are not required to be executed concurrently and can discretely be separated respectively, so that in contrast with conventional technology where two or more data transactions are executed concurrently, an excessive load applied to the terminals 4a to 4n as well as to the network can be avoided when performance thereof is measured. Accordingly, performance evaluation of a response time measurement in the data base servers 1a to 1n can correctly be executed.

In this embodiment, a data base access command 22 is transmitted from the test server 5 to the terminals 4a to 4n, and the terminals 4a to 4n access the data base servers 1a to 1n according to the data base access command 22, so that access to the data base from each of the terminals 4a to 4n can respectively be set by the side of one unit of test server 5. For this reason, it is not required for an operator to go to a plurality of terminals 4a to 4n each time when a command is to be set.

In this embodiment, performance evaluation data for the data base servers 1a to 1n is transmitted from the terminals 4a to 4n to the test server 5, and the transmitted data is stored in the test server 5, so that the performance evaluation data for the data base servers 1a to 1n can automatically be collected by the side of one unit of test server 5. For this reason, an operator can obtain the performance evaluation data without going to each of a plurality of terminals 4a to 4n.

General configuration of a network system in the present embodiment is the same as that of the network system shown in FIG. 1 in Embodiment 1. The network system in the embodiment comprises a plurality of data base servers 1a to 1n, a test server 5, and a plurality of terminals 4a to 4n, each connected to a wide area network 3. It should be noted that each of the terminals 4a to 4n, and each of the servers 1a to 1n and 5 may directly be connected to the wide area network 3, or may be connected thereto through a router, which does not make any difference.

Figure 6:
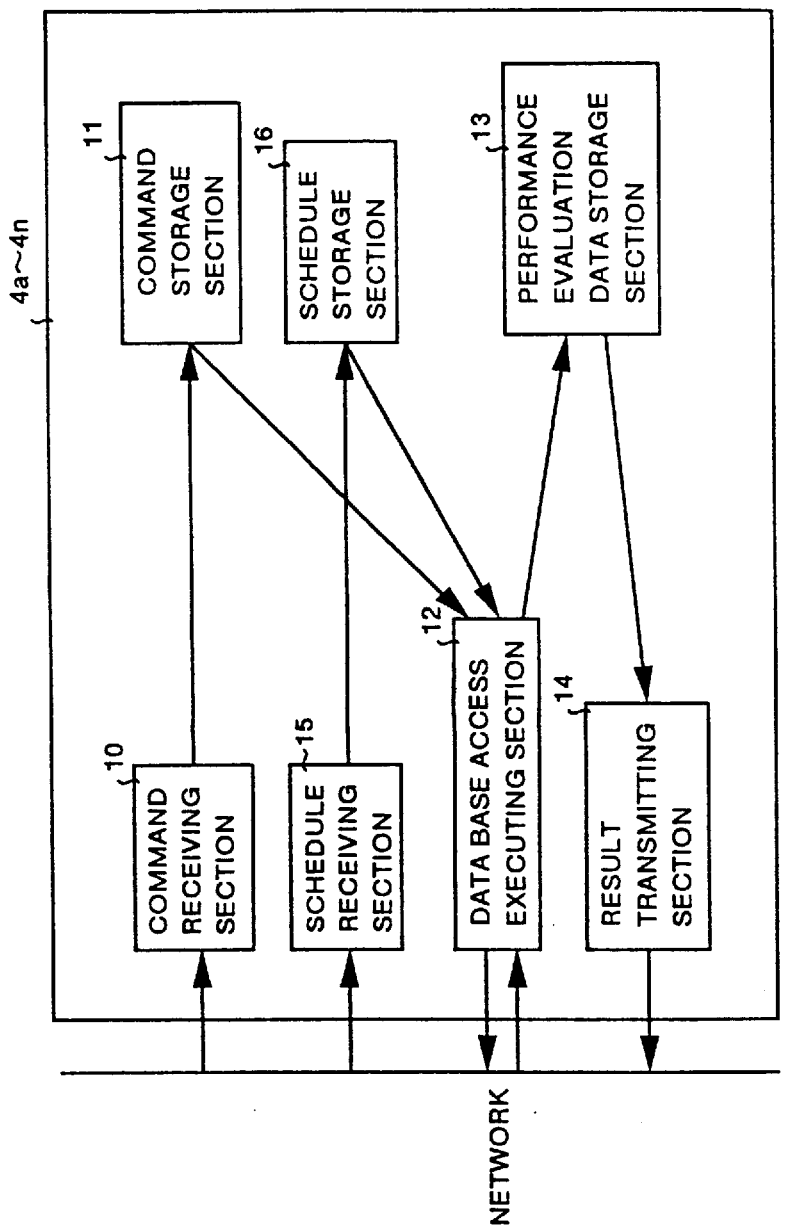
FIG. 6 is a block diagram showing configuration of a terminal in Embodiment 2 of the present invention.

FIG. 6 is a block diagram showing configuration of a terminal in Embodiment 2 of the present invention.

In FIG. 6, the same reference numerals are assigned to the numerals or portions corresponding to those in FIG. 2, and the reference numeral 15 indicates a schedule receiving section for receiving a schedule in which a data base access command execution time transmitted from the test server 5 is written, while the reference numeral 16 indicates a schedule storage section for storing the received schedule. A data base access executing section 12 reads a data base access command from the command storage section 11 according to a data base access command execution time in the schedule, transmits the read-out data base access command to the data base servers 1a to 1n for accessing. It should be noted that the data base servers 1a to 1n transmit a result of access corresponding to the data base access command transmitted from the terminals 4a to 4n to the terminals 4a to 4n.

Figure 7:
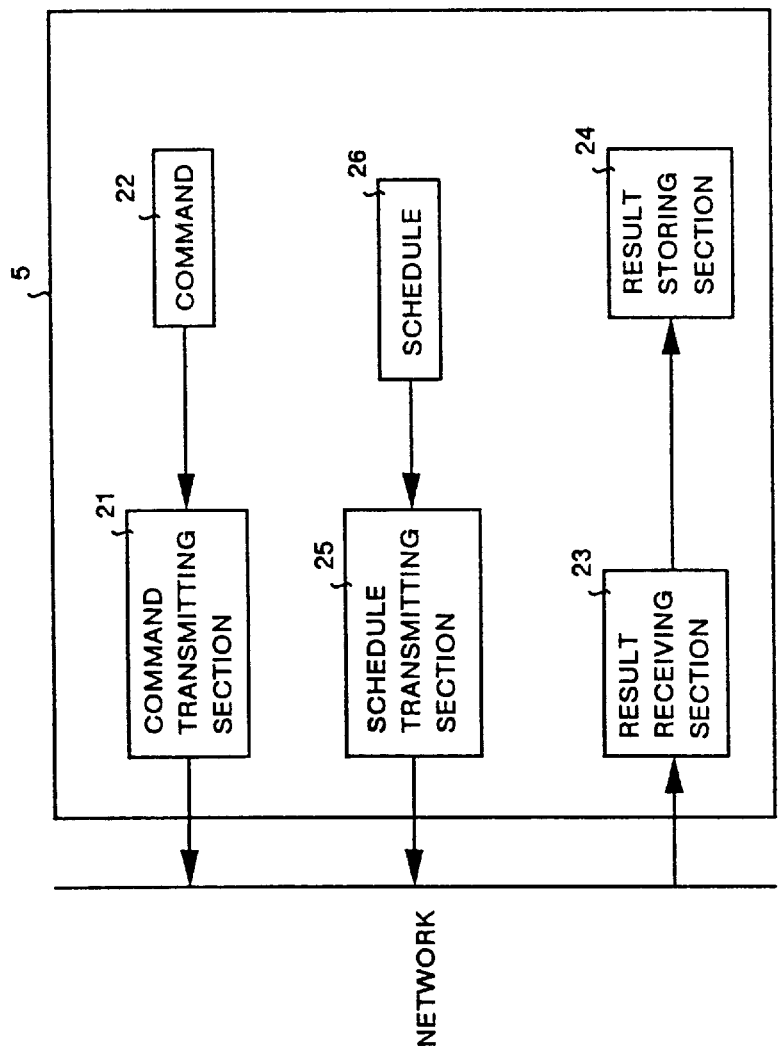
FIG. 7 is a block diagram showing configuration of a test server in Embodiment 2 of the present invention.

FIG. 7 is a block diagram showing configuration of a test server in Embodiment 2 of the present invention.

In FIG. 7, the same reference numerals are assigned to the numerals or portions corresponding to those in FIG. 3, and the reference numeral 25 indicates a schedule transmitting section for transmitting a schedule 26, in which a data base access command execution time is written, to the terminals 4a to 4n. The command transmitting section 21 transmits a data base access command 22, in which a data base access command execution time is not written, to the terminals 4a to 4n.

FIGS. 8A to 8D are views showing a format of a data base access command and that of a schedule shown in FIG. 7.

Figure 8A:
FIGS. 8A to 8D are views showing a format of a command as well as that of a schedule shown in FIG. 7.
Figure 8B:
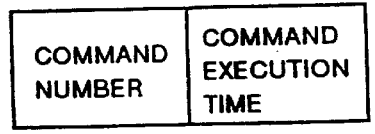
Figure 8C:
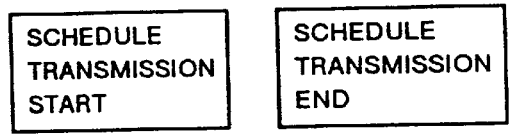

Written in the data base access command 22 are, as shown in FIG. 8A, a command number, a command, and a parameter. In a schedule 26, as shown in FIG. 8B, a command number corresponding to the data base access command 22 and a command execution time (a data base access command execution time) are written. When the test server 5 transmits the schedule 26 to the terminals 4a to 4n, as shown in FIG. 8C, commands each indicating start and end of the schedule transmission are transmitted thereto apart from the schedule itself. It should be noted that, when the command transmitting section 21 transmits a data base access command 22 to the terminals 4a to 4n, like Embodiment 1, commands each indicating start and end of a command transmission are transmitted thereto apart from the command itself.

Figure 8D:

As shown in FIG. 8D, for instance, the data base access executing section 12 in the terminals 4a to 4n executes access from the terminals 4a to 4n to the data base servers 1a to 1n with a SQL text of "SELECT*FROM URIAGE", which is command No. 0, at 15:00, executes access from the terminals 4a to 4n to the data base servers 1a to 1n with a SQL text of "SELECT*FROM SHOHIN", which is command No. 2, at 15:10, and executes access from the terminals 4a to 4n to the data base server 1a to 1n with the SQL text of "SELECT*FROM URIAGE", which is command No. 1, at 15:20.

FIG. 9 is a flow chart showing a flow of processing of a network system in Embodiment 2 according to the present invention.

At first, the test server 5, data base servers 1a to 1n, and terminals 4a to 4n are started. Then the command transmitting section 21 in the test server 5 transmits a data base access command 22 for testing the data base servers 1a to 1n to each of the terminals 4a to 4n (Step S11). The data base access command 22 transmitted to each of the terminals 4a to 4n may be used in common for all the terminals 4a to 4n, or may be different from each other according to each of the terminals 4a to 4n as required. The command receiving section 10 in each of the terminals 4a to 4n receives a data base access command 22 transmitted from the test server 5, and the command storage section 11 temporarily stores all the received data base access command 22 (Step S12).

The schedule transmitting section 25 in the test server 5 transmits a schedule 26 in which a data base access command execution time is written in each of the terminals 4a to 4n (Step S13). The schedule 26 transmitted to each of the terminals 4a to 4n may be used in common for all the terminals 4a to 4n, or may be different from each other according to each of the terminals 4a to 4n as required. The schedule receiving section 15 to each of the terminals 4a to 4n receives a schedule 26 transmitted from the test server 5, and the schedule storage section 16 temporarily stores all the received schedule 26 (Step S14).

When the data base access execution time written in the schedule 26 has come (Step S15), the data base access executing section 12 reads out a data base access command 22 corresponding to a command number of the schedule 26 from the command storage section 11 and transmits the read-out data base access command 22 to each of the data base servers 1a to 1n for accessing (Step S16). The data base severs 1a to 1n respond to access from the terminals 4a to 4n (Step S17), and transmit a result of access corresponding to the data base access command 22 transmitted from the terminals 4a to 4n to the terminals 4a to 4n. The data base access executing section 12 in each of the terminals 4a to 4n receives a result of access transmitted from the data base servers 1a to 1n, and measures a response time from a point of time when a data base access command 22 is transmitted to each of the data base servers 1a to 1n until a point of time when the result of access transmitted from each of the data base servers 1a to 1n is received. The performance evaluation data storage section 13 stores performance evaluation data for the data base servers 1a to 1n including a result of access received and a response time measured each by the data base access executing section 12.

The result transmitting section 14 determines whether the data base access executing section 12 has finished execution of all data base access command or not, and when it is determined that execution of all data base access command has been finished (Step S18), reads out performance evaluation data including a result of access and a response time from the performance evaluation data storage section 13 and transmits the read-out data to the test server 5 (Step S19). When it is determined that execution of all data base access command has not been finished (Step S18), the data base access executing section 12 returns to Step S15 and repeats access to the data base until all data base access commands have been executed. The result receiving section 23 in the test server 5 receives performance evaluation data for the data base servers 1a to 1n transmitted from the terminals 4a to 4n, and the result storing section 24 stores the received performance evaluation data for the data base servers 1a to 1n (Step S20).

As described above, in the present embodiment, the network system temporarily stores all the data base access commands 22 transmitted from the test server 5 in the command storage section 11, is in the stand-by state until a data base access command execution time written in the schedule 26 comes, reads out the data base access command 22 from the command storage section 11 when the data base access command execution time written therein has come, and accesses each of the data base servers 1a to 1n, and also the network system temporarily stores all the performance evaluation data for the data base severs 1a to 1n in the performance evaluation data storage section 13, reads out performance evaluation data from the performance evaluation data storage section 13 when it is determined that all data base access command has been finished, and transmits the read-out data to the test server 5, so that a processing of transmitting the data base access command 22 from the test server 5 to each of the terminals 4a to 4n, a processing for the terminals 4a to 4n to access the data base servers 1a to 1n, and a processing for the terminals 4a to 4n to transmit performance evaluation data to the test server 5 each can discretely be executed without execution of any processing thereof together with each other. For this reason, an exchange of data between the test server 5 and the terminals 4a to 4n, and an exchange data between the terminals 4a to 4n and the data base servers 1a to 1n are not concurrently executed and can discretely be executed, so that different from a case based on the conventional technology where a plurality of data transactions are executed concurrently, an excessive load applied to the terminals 4a to 4n as well as to the network can be avoided when performance thereof is measured. Accordingly, performance evaluation of a response time measurement in the data base servers 1a to 1n can correctly be executed.

In this embodiment, a data base access command to be executed and an execution time for a data base access command are separated from each other, and each is discretely executed according to the corresponding command number, so that, when a data base access command execution time is changed, the data base access command execution time can easily be changed not by transmitting again all the data base access commands like that in Embodiment 1, but by transmitting again only a schedule 26. Also the same data base access command can be executed a plurality of times at different time intervals.

In the embodiment, a data base access command 22 is transmitted from the test server 5 to each of the terminals 4a to 4n, and the terminals 4a to 4n access the data base servers 1a to 1n according to the data base access command 22, so that access to the data base from each of the terminals 4a to 4n can be set by the side of one unit of test server 5. For this reason, it is not required for an operator to go to a plurality of terminals 4a to 4n each time when a command is to be set.

In the embodiment, performance evaluation data for the data base servers 1a to 1n is transmitted from the terminals 4a to 4n to the test server 5, and the transmitted data is stored in the test server 5, so that the performance evaluation data for the data base servers 1a to 1n can automatically be collected by the side of one unit of test server 5. For this reason, an operator can obtain the performance evaluation data without going to each of a plurality of terminals 4a to 4n.

General configuration of a network system in the present embodiment is the same as that of the network system shown in FIG. 1 in Embodiment 1. The network system in the embodiment comprises a plurality of data base servers 1a to 1n, a test server 5, and a plurality of terminals 4a to 4n, each connected to a wide area network 3. It should be noted that each of the terminals 4a to 4n, and each of the servers 1a to 1n and 5 may directly be connected to the wide area network 3, or may be connected thereto through a router. Configuration of the terminals 4a to 4n and that of data base servers 1a to 1n in the embodiment are the same as those in Embodiment 1.

FIG. 10 is a block diagram showing configuration of a terminal in Embodiment 3 according to the present invention.

In FIG. 10, the same reference numerals are assigned to the same numerals or portions corresponding to those in FIG. 2. The command transmitting section 21 in the test server 5 transmits data base access command, in which a data base access command execution time is written, to each of the terminals 4a to 4n, and at the same time transmits a performance evaluation data transmission command, in which a performance evaluation data transmission command execution time is written, to each of the terminals 4a to 4n. The command receiving section 10 in each of the terminals 4a to 4n receives the data base access command and performance evaluation data transmission command each transmitted from the test server 5. The command storage section 11 stores the received data base access command and performance evaluation data transmission command. The result transmitting section 14 reads out performance evaluation data, after it is determined that execution of all data base access commands has been finished, from the performance evaluation data storage section 11 according to a performance evaluation data transmission command execution time written in the performance evaluation data transmission command and transmits the read-out data to the test server 5.

FIGS. 11A to 11C are views showing formats each for a data base access command and a performance evaluation data transmission command in Embodiment 3 according to the present invention.

Written in a data base access command 22 are, as shown in FIG. 11A, a data base access command execution time, a data base access, data base access command, and a parameter. In a performance evaluation data transmission command, as shown in FIG. 11B, a performance evaluation data transmission command execution time, performance evaluation data transmission, a destination of transmission of performance evaluation data are written. When the test server 5 transmits a data base access command and performance evaluation data, like in Embodiment 1, commands each indicating start and end of command transmission are transmitted apart from the command itself.

As shown in FIG. 11C, for instance, the data base access executing section 12 in each of the terminals 4a to 4n executes access from the terminals 4a to 4n to the data base servers 1a to 1n with a SQL text of "SELECT*FROM URIAGE" at 15:00, and the result transmitting section 14 transmits the performance evaluation data as a result of the access from the terminals 4a to 4n to the test server 5 at 16:00. It should be noted that a data base access command is differentiated from a performance evaluation data transmission command by inputting each of flags to differentiate between both commands to each of them. In this embodiment, the data base access shown in FIG. 11A and the result transmission shown in FIG. 11B correspond to each of the flags.

Figure 12:
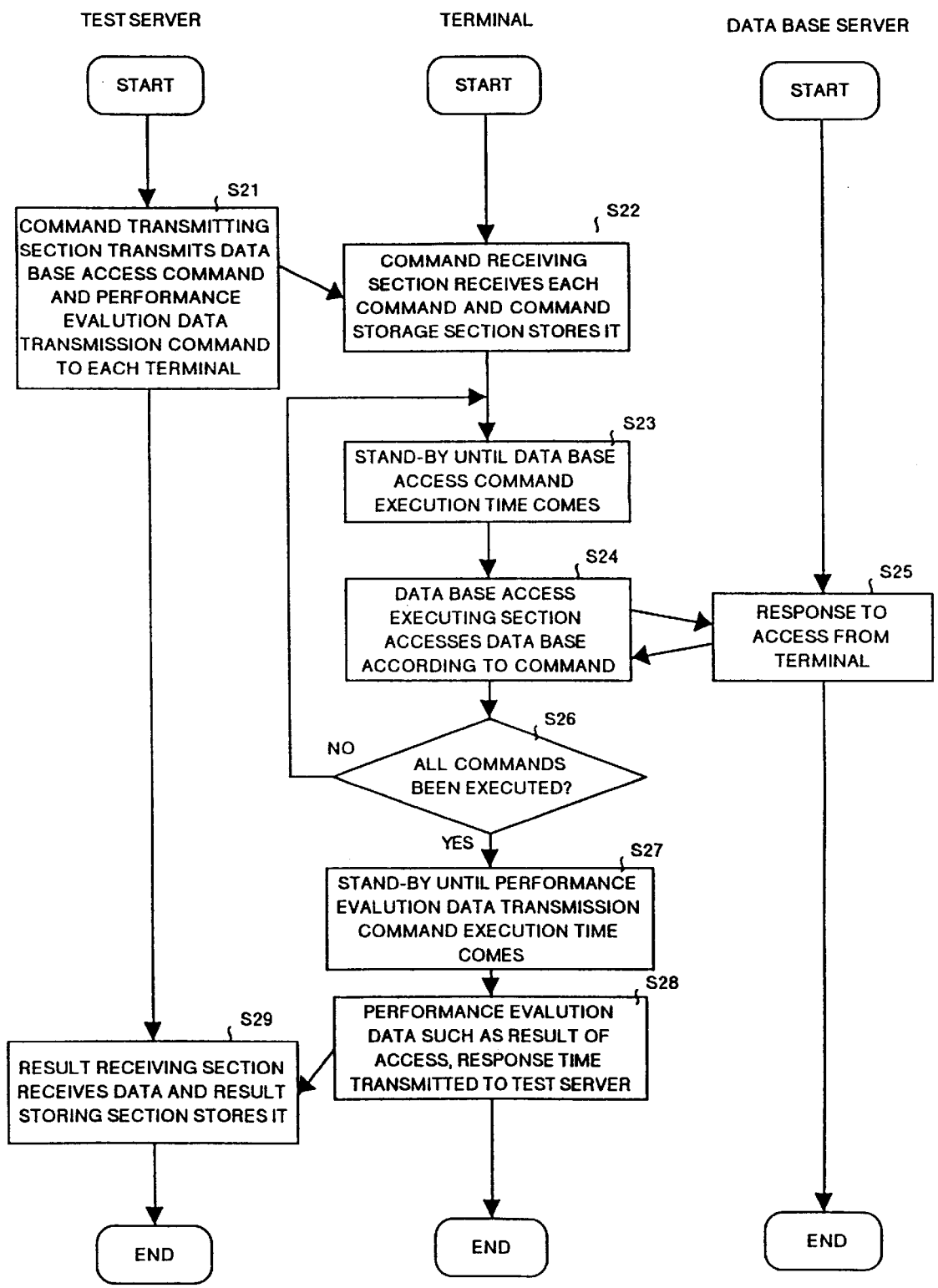
FIG. 12 is a flow chart showing a flow of processing of a network system in Embodiment 3 of the present invention.

FIG. 12 is a flow chart showing a flow of processing of a network system in Embodiment 3 according to the present invention.

At first, the test server 5, data base servers 1a to 1n, terminals 4a to 4n are started. Then the command transmitting section 21 in the test server 5 transmits a data base access command, in which data base access command execution time for testing the data base servers 1a to 1n is written, and a performance evaluation data transmission command, in which performance evaluation data transmission command execution time is written, to each of the terminals 4a to 4n (Step S21). The data base access command and performance evaluation data transmission command each transmitted to each of the terminals 4a to 4n may be used in common for all the terminals 4a to 4n, or may be different from each other according to each of the terminals 4a to 4n as required.

The command receiving section 10 in each of the terminals 4a to 4n receives a data base access command and performance evaluation data transmission command each transmitted from the test server 5, and the command storage section 11 temporarily stores all the received data base access command and performance evaluation data transmission command (Step S22). When the data base access execution time written in the data base access command has come (Step S23), the data base access executing section 12 reads out a data base access command corresponding to data base access command execution time from the command storage section 11 and transmits the read-out data base access command to each of the data base servers 1a to 1n for accessing (Step S24).

The data base severs 1a to 1n respond to access from the terminals 4a to 4n (Step S25), and transmit a result of access corresponding to the data base access command transmitted from the terminals 4a to 4n to the terminals 4a to 4n. The data base access executing section 12 in each of the terminals 4a to 4n receives a result of access transmitted from the data base servers 1a to 1n, and measures a response time from a point of time when a data base access command is transmitted to each of the data base servers 1a to 1n until a point of time when a result of access transmitted from each of the data base servers 1a to 1n is received. The performance evaluation data storage section 13 stores performance evaluation data for the data base servers 1a to 1n including a result of access received and a response time measured each by the data base access executing section 12.

The result transmitting section 14 determines whether the data base access executing section 12 has finished execution of all commands or not, and after it is determined that execution of all commands has been finished (Step S26), when a performance evaluation data transmission command execution time written in the performance evaluation data transmission command has come (Step S27), reads out performance evaluation data including therein a result of access and a response time from the performance evaluation data storage section 13 and transmits the read-out data to the test server 5 (Step S28). When it is determined that execution of all data base access command has not been finished (Step S26), the data base access executing section 12 returns to Step S23 and repeats access to the data base until all data base access commands have been executed. The result receiving section 23 in the test server 5 receives performance evaluation data for the data base servers 1a to 1n transmitted from the terminals 4a to 4n, and the result storing section 24 stores the received performance evaluation data for the data base servers 1a to 1n (Step S29).

As described above, in the present embodiment, a data base access command in which data base access command execution time is written and a performance evaluation data transmission command in which performance evaluation data transmission command execution time is written are transmitted from the test server 5 to each of the terminal 4a to 4n, so that a data base access command execution time and a performance evaluation data transmission command execution time can discretely be set as required. For this reason, performance evaluation data can be transmitted to the test server 5 after data base access in all the terminals 4a to 4n has finished, or in a network in which a charge for database use is changed according to a time zone, performance evaluation data can be transmitted to the test server 5 when a charge thereof is cheap.

General configuration of a network system in the present embodiment is the same as that of the network system shown in FIG. 1 in Embodiment 1. The network system in the embodiment comprises a plurality of data base servers 1a to 1n, a test server 5, and a plurality of terminals 4a to 4n, each connected to a wide area network 3. It should be noted that each of the terminals 4a to 4n, and each of the servers 1a to 1n and 5 may directly be connected to the wide area network 3, or may be connected thereto through a router.

Figure 13:
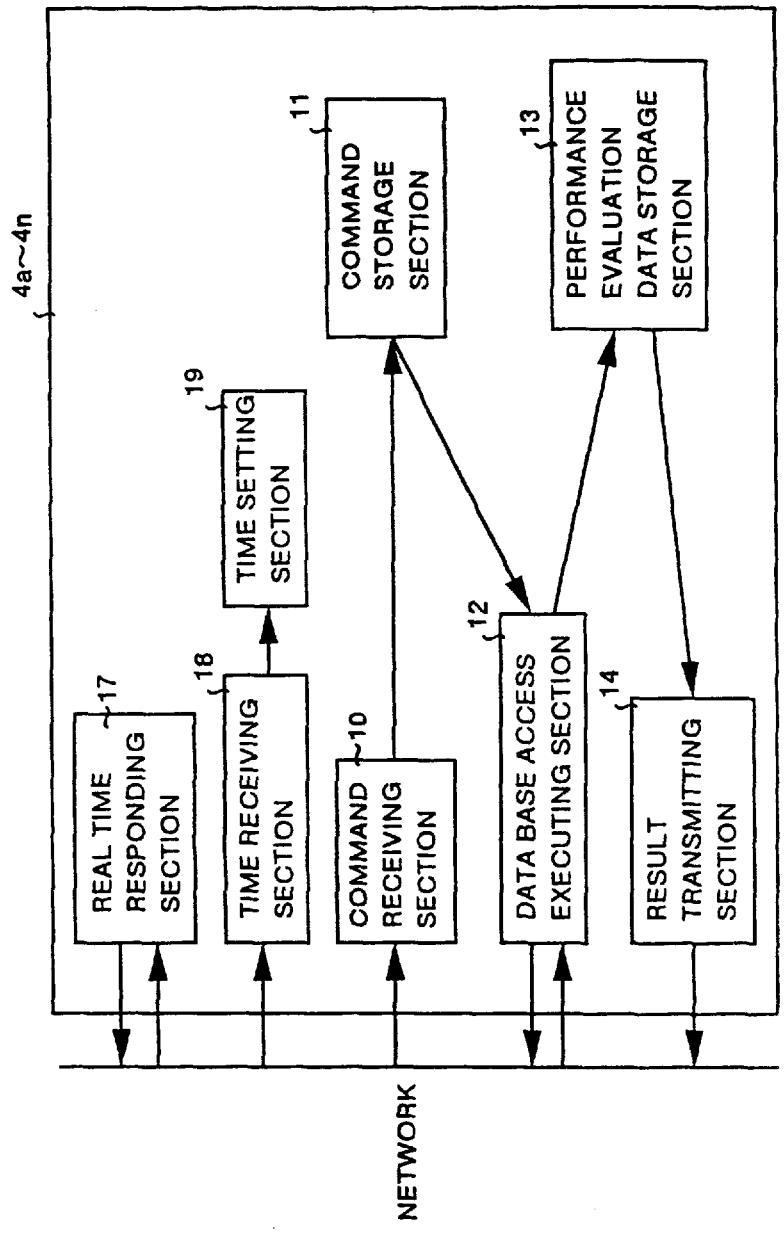
FIG. 13 is a block diagram showing configuration of a terminal in Embodiment 4 of the present invention.

FIG. 13 is a block diagram showing configuration of a terminal in Embodiment 4 according to the present invention.

In FIG. 13, the same reference numerals are assigned to the reference numerals or portions corresponding to those in FIG. 2, and the reference numeral 17 indicates a real time responding section for immediately returning a response to the test server 5 in response to transmission from the test server 5, the reference numeral 18 indicates a time receiving section for receiving a time setting command transmitted from the test server 5, and the reference numeral 19 indicates a time setting section for setting time for the terminals according to the received time setting command.

Figure 14:
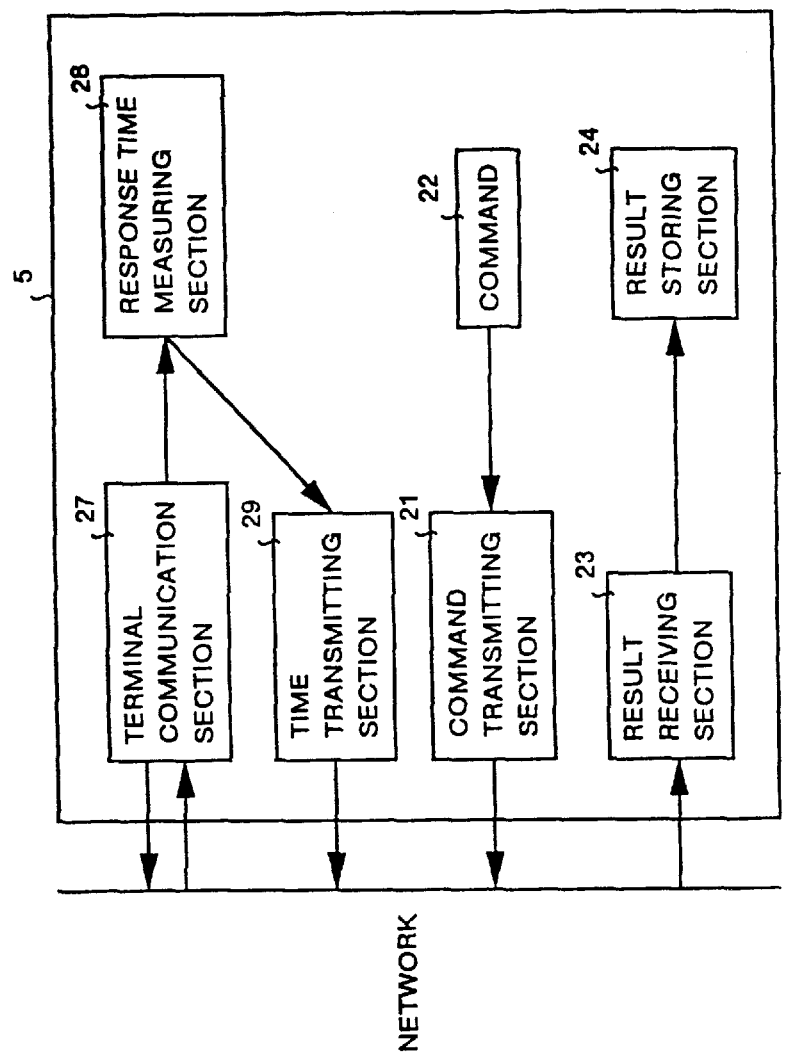
FIG. 14 is a block diagram showing configuration of a test server in Embodiment 4 of the present invention.

FIG. 14 is a block diagram showing configuration of a test server in Embodiment 4 according to the present invention.

In FIG. 14, the same reference numerals are assigned to the reference numerals or portions corresponding to those in FIG. 31 and the reference numeral 27 indicates a terminal communication section for communicating with the terminals 4a to 4n, the reference numeral 28 indicates a response time measuring section for measuring a response time from a point of time when a message is transmitted to each of the terminals 4a to 4n until a point of time when a response is returned from the terminals 4a to 4n, and the reference numeral 29 indicates a time transmitting section for transmitting a time setting command to each of the terminals 4a to 4n according to the measured response time.

Figure 15:
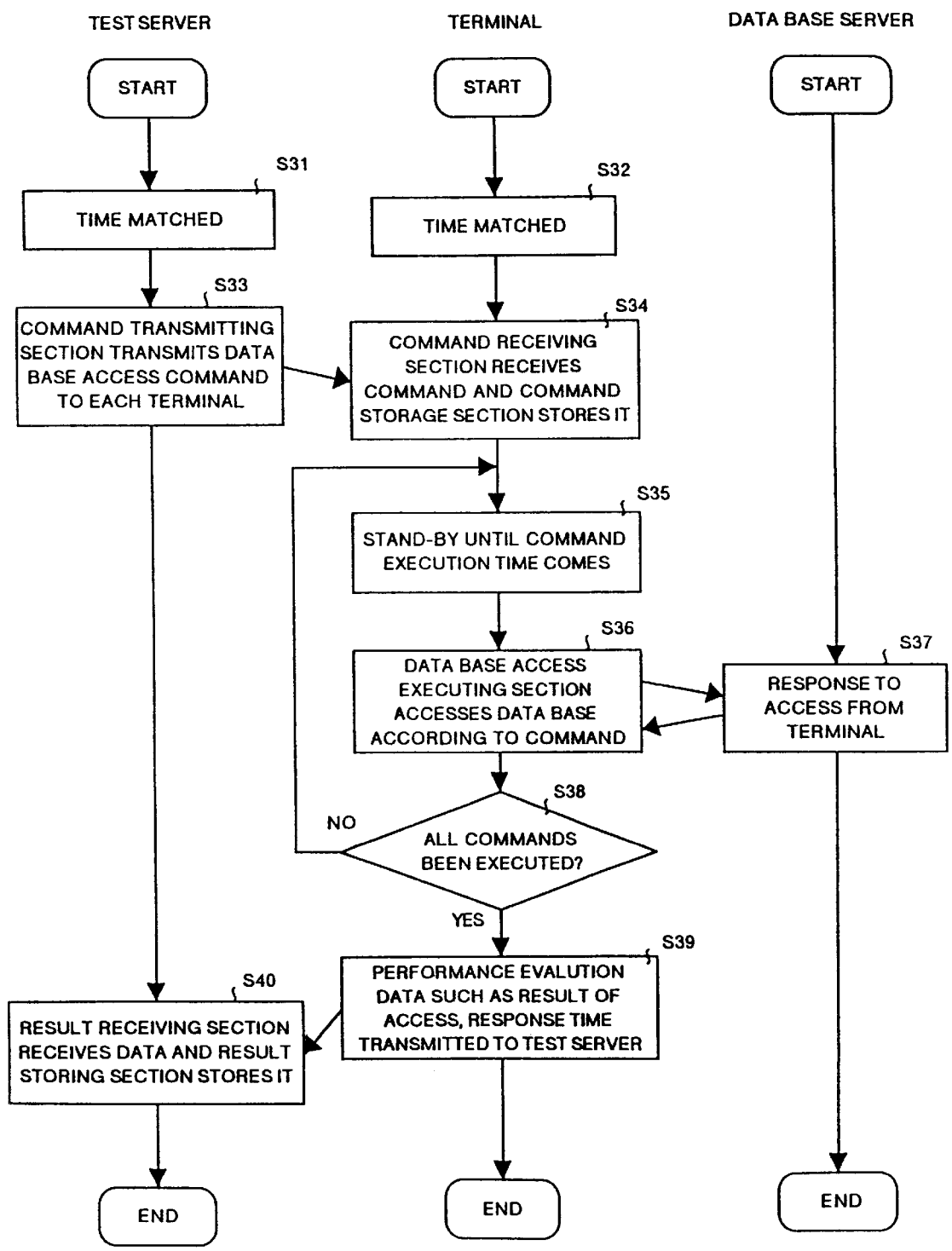
FIG. 15 is a flow chart showing a flow of processing of a network system in Embodiment 4 of the present invention.
Figure 16:
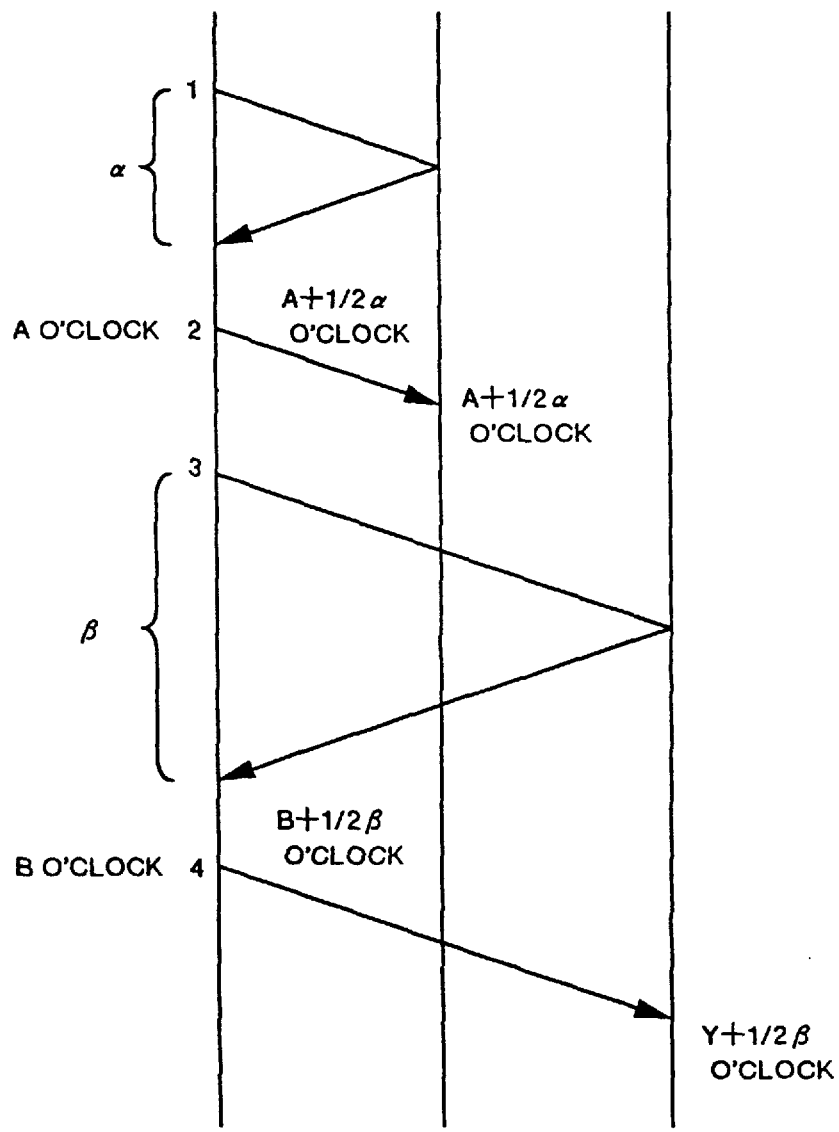
FIG. 16 is a view showing a method of setting time in Embodiment 4 of the present invention.

FIG. 15 is a flow chart showing a flow of processing of a network in Embodiment 4 according to the preset invention, and FIG. 16 is a view showing a method of setting time for a terminal in Embodiment 4 according to the present invention.

In the embodiment, a procedure of matching time for each of the terminals 4a to 4n with each other is added after the procedure that the test server 5 and program for the terminals 4a to 4n are started in Embodiment 1. There are various methods of matching time for each of the terminals 4a to 4n with each other, and, for instance, the following procedure is used herein.

At first, the terminal communication section 27 in the test server 5 communicates with to the terminal 4a, and the real time responding section 17 in the terminal 4a immediately returns a response to the test server 5 in response to transmission from the test server 5. The response time measuring section 28 in the test server 5 measures a response time from a point of time when a message is transmitted to the terminal 4a until a point of time when a response is returned from the terminal 4a. It is assumed that the response time is α. It is found that a delay in a wide area network between the test server 5 and the terminal 4a is ½ α.

The time transmitting section 29 in the test server 5 transmits a time setting command to the terminal 4a according to the measured response time. The time receiving section 18 in the terminal 4a receives the time setting command transmitted from the test server 5, and the time setting section 19 sets time for the terminal 4a according to the received time setting command (Steps S31, S32). As shown in FIG. 16, in a case where a time setting command is transmitted from the test server 5 to the terminal 4a at A o'clock in the clock of the test server 5, the test server 5 instructs the terminal 4a to match its time with "A+½ α" o'clock. The time setting command transmitted from the test server 5 reaches the time receiving section 18 in the terminal 4a after ½ α passes, so that the time in the terminal 4a is set to a time point of "A+½ α" by the time setting section 19. With this feature, the time of the test server 5 is set to that of the terminal 4a.

Similarly, transmission is made to the terminal 4b, so that the time of the test server 5 is set to that of the terminal 4b. As described above, by matching the time of the terminal 4a with that of the test server 5 and matching the time of test server 5 with that of the terminal 4b, the time of the terminal 4a and that of the terminal 4b are set to each other. Even when the number of terminals are more than three, the time in all terminals are also set to each other.

As described above, after matching the time for each of the terminals 4a to 4n with each other, the terminals are operated according to the same procedure as that in Embodiment 1, as described above. In this step, if schedules to be transmitted to all the terminals 4a to 4n are set to the same ones, access from all the terminals 4a to 4n to the data base servers 1a to 1n are simultaneously generated.

Then, the command transmitting section 21 in the test server 5 transmits a data base access command 22 in which a data base access command execution time for testing the data base servers 1a to 1n is written to each of the terminals 4a to 4n (Step S33). The data base access command 22 transmitted to each of the terminals 4a to 4n may be common to all the terminals 4a to 4n, or may be different for each of the terminals 4a to 4n as required. The command receiving section 10 in the terminals 4a to 4n receives the data base access command 22 transmitted from the test server 5, and the command storage section 11 temporarily stores all the received data base access commands 22 (Step S34).

When the data base access execution time written in the data base access command 22 has come (Step S35), the data base access executing section 12 reads out a data base access command 22 from the command storage section 11 and transmits the data base access command 22 to each of the data base servers 1a to 1n according to the read-out data base access command 22 for access (Step S36). The data base servers 1a to in respond to access from the terminals 4a to 4n (Step S37), and transmit a result of access corresponding to the data base access command 22 transmitted from the terminals 4a to 4n to each of the terminals 4a to 4n.

The data base access executing section 12 in the terminals 4a to 4n receives a result of access transmitted from the data base servers 1a to 1n, and measures a response time from a point of time when the data base access command 22 is transmitted to the data base servers 1a to 1n until a point of time when a result of access transmitted from the data base servers 1a to 1n. The performance evaluation data storage section 13 stores performance evaluation data for the data base servers 1a to 1n including a result of access received and a response time measured each by the data base access executing section 12.

The result transmitting section 14 determines whether the data base access executing section 12 has finished execution of all data base access commands or not, and when it is determined that execution of all data base access commands has been finished (Step S38), reads out performance evaluation data including a result of access and a response time from the performance evaluation data storage section 13 and transmits the read-out data to the test server 5 (Step S39). The data base access executing section 12, when it is determined that execution of all data base access commands has not been finished (Step S38), returns to Step S35, and repeats accessing to data base until all the data base access commands are executed. The result receiving section 23 in the test server 5 receives performance evaluation data for the data base servers 1a to 1n transmitted from the terminals 4a to 4n, and the result storing section 24 stores the received performance evaluation data for the data base servers 1a to 1n (Step S40).

As described above, in the embodiment, by setting the time of the test server 5 to that in each of the terminals 4a to 4n, the time in each of the terminals becomes identical, so that access from a plurality of terminals 4a to 4n to the data base servers 1a to 1n can simultaneously be executed, which makes it possible to execute performance evaluation of simultaneous access from the plurality of terminals 4a to 4n to the data base servers 1a to 1n.

General configuration of a network system in the present embodiment is the same as that of the network system shown in FIG. 1 in Embodiment 1. The network system in the embodiment comprises a plurality of data base servers 1a to 1n each connected to a wide area network 3, a test server 5, and a plurality of terminals 4a to 4n. It should be noted that each of the terminals 4a to 4n, and each of the servers 1a to 1n, or may be connected thereto through a router and 5 may directly be connected to the wide area network 3.

Figure 17:
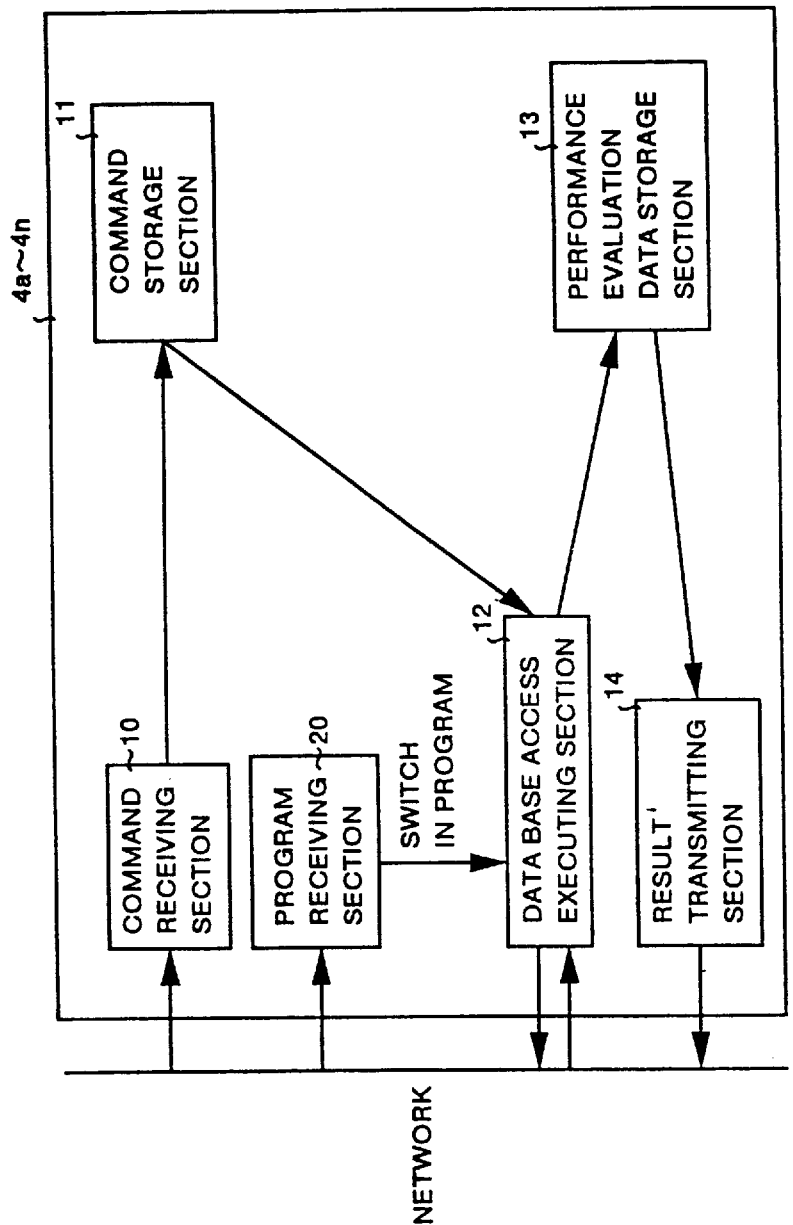
FIG. 17 is a block diagram showing configuration of a terminal in Embodiment 5 of the present invention.

FIG. 17 is a block diagram showing configuration of a terminal in Embodiment 5 according to the present invention.

In FIG. 17, the same reference numerals are assigned to the numerals or portions corresponding to those in FIG. 2, and the reference numeral 20 indicates a program receiving section for receiving a new data base access program for switching a data base access program for each of the terminals 4a to 4n transmitted from the test server 5. Each of the terminals 4a to 4n switches the data base access program for the data base access execution section 12 to the received new data base access program.

Figure 18:
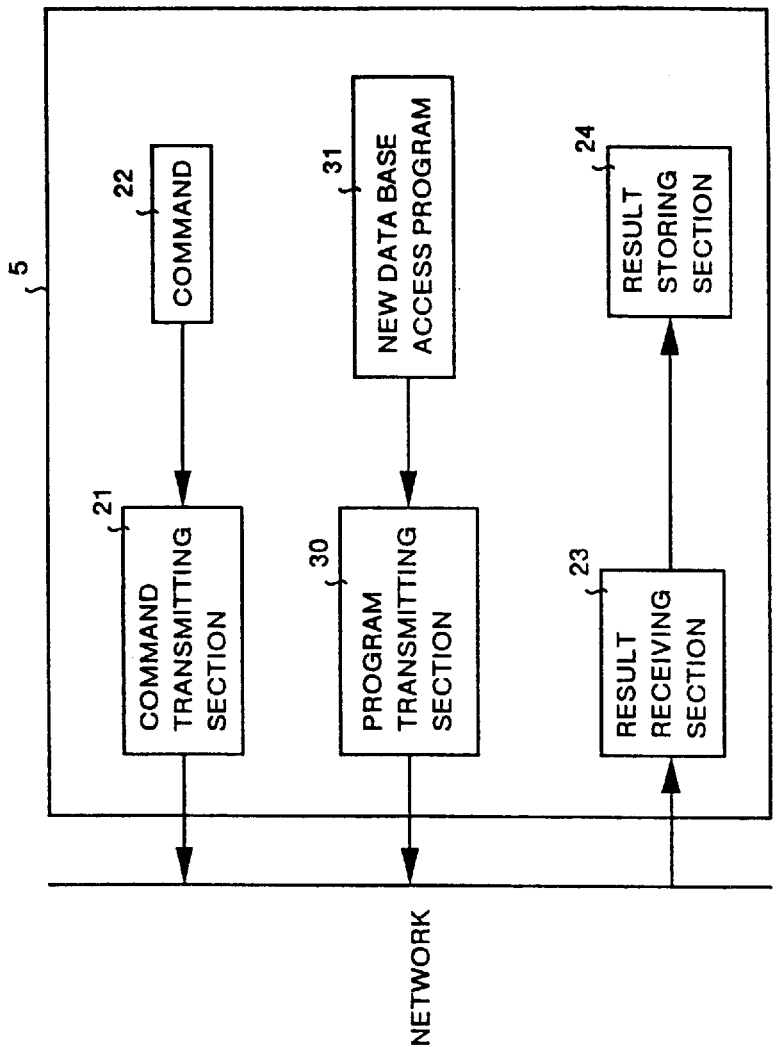
FIG. 18 is a block diagram showing configuration of a test server in Embodiment 5 of the present invention.

FIG. 18 is a block diagram showing configuration of a test server in Embodiment 5 according to the present invention.

In FIG. 18, the same reference numerals are assigned to the numerals or portions corresponding to those in FIG. 3, and the reference numeral 30 indicates a program transmitting section for transmitting a new data base access program 31 for switching a data base access program for each of the terminals 4a to 4n to each of the terminals 4a to 4n.

Figure 19:
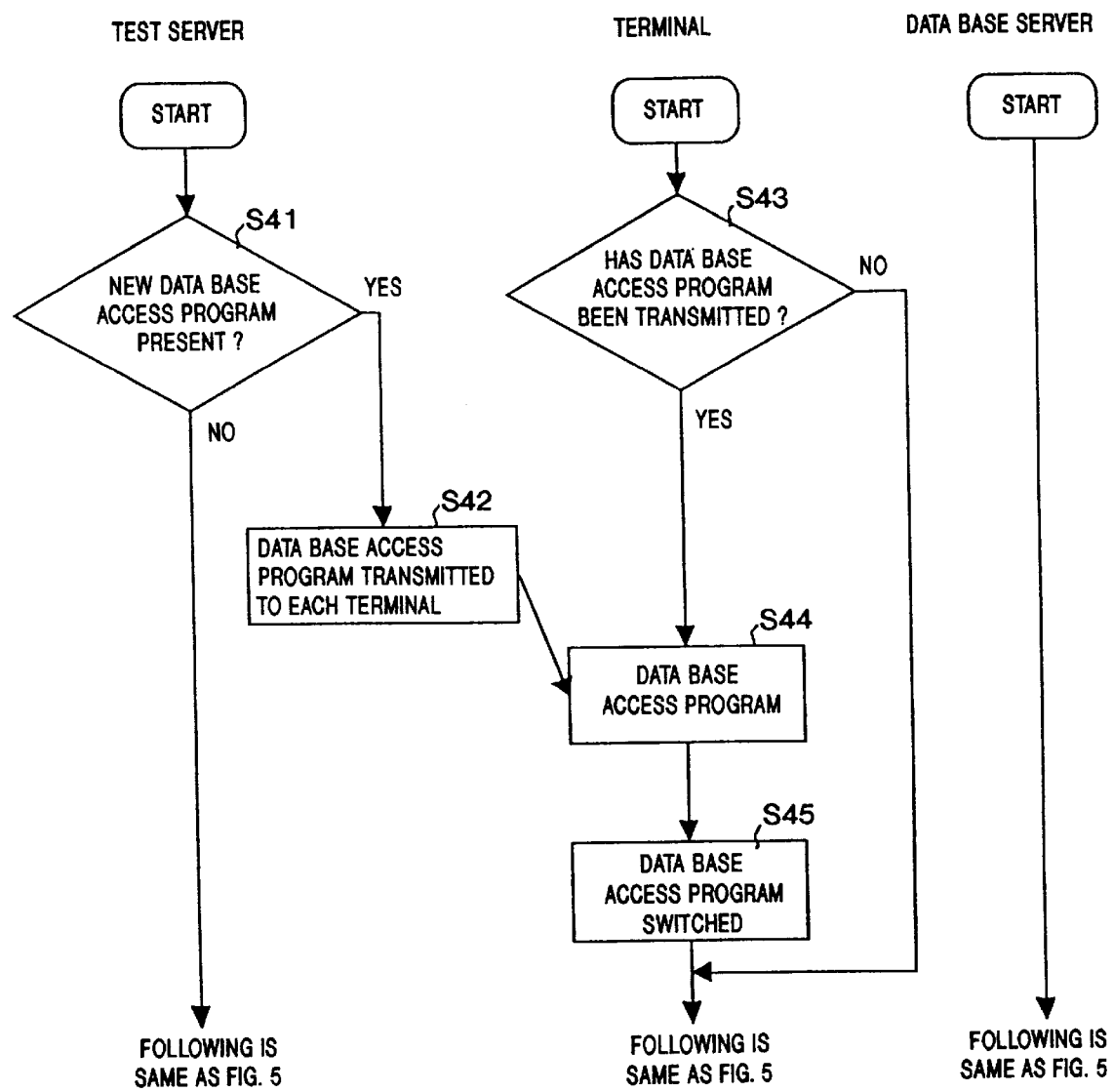
FIG. 19 is a flow chart showing a flow of processing of a network system in Embodiment 5 of the present invention.
Figure 22:
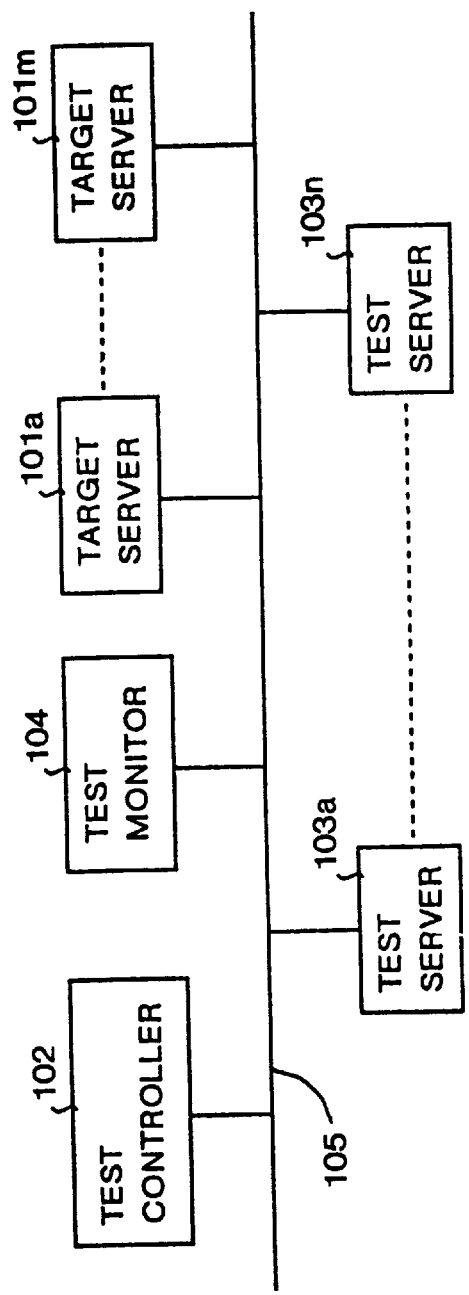
FIG. 22 is a block diagram showing configuration of a network system based on the conventional technology.

FIG. 19 is a flow chart showing a flow of processing of a network system in Embodiment 5 according to the present invention.

The program transmitting section 30 in the test server 5 transmits, if a new data base access program 31 for switching the data base access program for each of the terminals 4a to 4n is present therein (Step S41), the new data base access program 31 to each of the terminals 4a to 4n (Step S42). After the data base access program 31 has been transmitted and if a new data base access program is not therein (Step S42), system control goes to Step Si shown in FIG. 5 in Embodiment 1. Description for a flow of processing is the same as that in Embodiment 1, so that description thereof is omitted herein.

The program receiving section 20 in each of the terminals 4a to 4n receives, when a new data base access program 31 is transmitted from the test server 5 (Step S43), the new data base access program 31 (Step S44). Then each of the terminals 4a to 4n exchanges the data base access program already stored in the data base access program execution section 12 with the received new data base access program 31 (Step S45). After the new data base access program 31 is switched and if the new data base access program is not transmitted (Step S43), system control goes to Step Si in FIG. 5 in Embodiment 1. Description for a flow of processing is the same as that in Embodiment 1, so that description thereof is omitted herein.

As described above, in the embodiment, the new data base access program for switching the data base access program for each of the terminals 4a to 4n is transmitted from the test server 5 to each of the terminals 4a to 4n, and the data base access program for each of the terminals 4a to 4n is replaced by the new data base access program 31 transmitted from the test server 5, so that change of the data base access program for each of the terminals 4a to 4n can be executed by the side of the test server 5 without being required for an operator to go to each of the terminals 4a to 4n. For this reason, all data base access programs for the terminals 4a to 4n can be controlled by the side of the test server 5. Accordingly, the system can be operated even in a case where a new function is added to the data base access program, and in addition thereto, performance evaluation can be made of a system other than the data base servers 1a to 1n by changing the data base access program as required.

General configuration of a network system in the present embodiment is the same as that of the network system shown in FIG. 1 in Embodiment 1. The network system in the embodiment comprises a plurality of data base servers 1a to 1n each connected to a wide area network 3, a test server 5, and a plurality of terminals 4a to 4n. It should be noted that each of the terminals 4a to 4n, and each of the servers 1a to 1n, or may be connected thereto through a router and 5 may directly be connected to the wide area network 3.

Configuration of each of the terminals 4a to 4n and the test server 5 in the embodiment is the same as that in Embodiment 1. The command transmitting section 21 in the test sever 5 transmits a measurement start command, in which a measurement start command execution time other than the data base access program is written, to each of the terminals 4a to 4n. The command receiving section 10 in each of the terminals 4a to 4n receives the measurement start command transmitted from the test server 5, and the command storage section 11 stores the received measurement start command. The data base access execution section 12 reads out a data base access command from the command storage section 11 according to the data base access command execution time, measured according to the measurement start command execution time as a reference, written in the data base access command, and transmits the read-out command to each of the data base server 1a to 1n for accessing.

FIGS. 20A to 20C are views showing a format of a measurement start command and that of a data base access command in Embodiment 6 according to the present invention.

Written in the measurement start command are, as shown in FIG. 20A, a measurement start command execution time (absolute time) and a measurement start. In the data base access command, as shown in FIG. 20B, a data base access command execution time (relative time measured according to the measurement start command execution time as a reference), a data base access, a data base access command, and a parameter are written. When the test server 5 transmits a data base access command to each of the terminals 4a to 4n, like in Embodiment 1, commands indicating start and end of command transmission are transmitted apart from the command itself.

As shown in FIG. 20C, for instance, the data base access executing section 12 in each of the terminals 4a to 4n starts measurement at 15:00 according to the measurement start command execution time written in the measurement start command, and executes access from the terminals 4a to 4n to the data base servers 1a to 1n with the data base access command execution time measured according to the measurement start command execution time as a reference, namely a SQL text of "SELECT*FROM SHOHIN" at one hour later from 15:00 (16:00). It should be noted that a data base access command is differentiated from a measurement start command by inputting each of flags to differentiate between both commands to each of them. In this embodiment, the measurement start shown in FIG. 20A and data base access shown in FIG. 20B correspond to each of the flags.

FIG. 21 is a flow chart showing a flow of processing of a network system in Embodiment 6 according to the present invention.

At first, the test server 5, data base servers 1a to 1n, terminals 4a to 4n are started. Then the command transmitting section 21 in the test server 5 transmits, after a data base access command 22 in which data base access command execution time for testing the data base servers 1a to 1n is written is transmitted to each of the terminals 4a to 4n (Step S51), a measurement start command, in which measurement start command execution time is written, to each of the terminals 4a to 4n (Step S52). The data base access command 22 and measurement start command transmitted to each of the terminals 4a to 4n may be common to all the terminals 4a to 4n, or may be different for each of the terminals 4a to 4n as required.

The command receiving section 10 in each of the terminals 4a to 4n receives data base access command 22 and the measurement start command each transmitted from the test server 5, and the command storage section 11 temporarily stores all the received data base access command 22 and measurement start command (Step S53). The data base access executing section 12 measures a data base access command execution time written in the data base access command according to the data base access command execution time as a reference when the measurement start command executing time written in the measurement start command has come (Step S54). When the data base access execution time, written in the data base access command 22, measured according to the measurement start command as reference has COME (Step S54), the data base access command executing section 12 reads out the data base access command 22 from the command storage section 11 and transmits the read-out data base access command 22 to each of the data base servers 1a to 1n for accessing (Step S55).

The data base severs 1a to 1n respond to access from the terminals 4a to 4n (Step S56), and transmit a result of access corresponding to the data base access command transmitted from the terminals 4a to 4n to the terminals 4a to 4n. The data base access executing section 12 in each of the terminals 4a to 4n receives a result of access transmitted from the data base servers 1a to 1n, and measures a response time from a point of time when a data base access command is transmitted to each of the data base servers 1a to 1n until a point of time when a result of access transmitted from each of the data base servers 1a to 1n is received. The performance evaluation data storage section 13 stores performance evaluation data for the data base servers 1a to 1n including a result of access received and a response time measured each by the data base access executing section 12.

The result transmitting section 14 determines whether the data base access executing section 12 has finished execution of all data base access commands or not, and when it is determined that execution of all the data base access commands has been finished (Step S57), reads out performance evaluation data including therein a result of access and a response time from the performance evaluation data storage section 13 and transmits the read-out data to the test server 5 (Step S58). When it is determined that execution of all data base access command has not been finished (step S57), the data base access executing section 12 returns to Step S54 and repeats access to the data base until all the data base access commands have been executed. The result receiving section 23 in the test server 5 receives performance evaluation data for the data base servers 1a to 1n transmitted from the terminals 4a to 4n, and the result storing section 24 stores the received performance evaluation data for the data base servers 1a to 1n (Step S59).

As described above, in the embodiment, a data base access command is read out from the command storage section 11 according to the data base access command execution time, written in the data base access command, measured according to the measurement start command execution time written in the measurement start command as a reference, and the read-out command is transmitted to each of the data base servers 1a to 1n for accessing, so that the same command can be executed a plurality of times at a different time as well as at specified time intervals.

In Embodiments 1 to 6 described above, a method of connecting communications between the test server 5 and each of the terminals 4a to 4n is not defined, but such configuration may be employed that the connection is always made from each of the terminals 4a to 4n to the test server 5. In this case, performance of the system including therein the terminals 4a to 4n directly connected to the wide area network 3 can be measured. The method described above is effective in a case where the terminals 4a to 4n are directly connected to the wide area network 3, and at the same time where communication protocol inhibiting connection unless connection thereto is executed from each of the terminals 4a to 4n is employed.

Also in Embodiments 1 to 6 described above, in a case where the test server 5 and each of the terminals 4a to 4n are communicated to each other, connection may be insured during communication, and communication may be disconnected when communication is not executed. In this case, it is possible to reduce a period of time of communicating through the wide area network 3, which makes it possible to reduce costs required for performance evaluation of the system. The method described above is effective in a case where a network includes a wide area network 3 and at the same time where a phone rate is charged proportionally to a period of time when the wide area network is connected thereto.

This application is based on Japanese patent application No. HEI 7-295526 filed in the Japanese Patent Office on Nov. 14, 1995, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claim is:

1. A network system comprising:

a wide area network;

a plurality of target servers as objects for monitoring and connected to said wide area network;

a plurality of terminals connected to said wide area network for accessing and monitoring performance of said target servers; and a test server connected to said wide area network for transmitting, to said terminals, commands for testing said target servers, wherein:

said test server comprises:

command transmitting means for transmitting a data base access command signal including a data base access command execution time and a data base access command, to said terminals, performance evaluation data receiving means for receiving performance evaluation data for said target servers, transmitted from said terminals, and first performance evaluation data storage means for storing the received performance evaluation data;

each of said terminals comprises:

command receiving means for receiving the data base access command signal transmitted from said test server, command storage means for storing the received data base access command signal, access executing means for reading the data base access command from said command storage means according to a data base access command execution time in the data base access command signal and for transmitting the data base access command to said target servers and accessing said target servers at the data base access command execution time, access result receiving means for receiving a result of access corresponding to the data base access command transmitted from said target servers, response time measuring means for measuring a response time of said target servers from transmission of the data base access command to said target servers until time when a reception of results of access transmitted from said target servers, second performance evaluation data storage means for storing performance evaluation data including a result of access received by said access result receiving means and a response time measured by said response time measuring means, command execution end determining means for determining whether all data base access commands have been executed, and performance evaluation data transmitting means for reading the performance evaluation data from said second performance data storage means and transmitting the performance evaluation data to said test server when all data base access commands from all of said terminals have been executed by said target servers and all of the performance evaluation data has been received by said terminals; and each of said target servers includes an access result transmitting means for transmitting a result of access corresponding to the data base access command transmitted from said terminals to each of said terminals.

2. The network system according to claim 1 wherein:

said command transmitting means in said test server transmits to said terminals a performance evaluation data transmission command including a performance evaluation data transmission command execution time, said command receiving means in said terminal receives the performance evaluation data transmission command transmitted from said test server, said command storage means stores the received performance evaluation data transmission command, said performance evaluation data transmitting means for said terminals reads performance evaluation data from said second performance evaluation data storage means according the performance evaluation data transmission command execution time in the performance evaluation data transmission command and transmits the performance evaluation data to said test server after all of the data base access commands from all of the terminals have been executed by the target servers and all performance of the performance evaluation data has been received by said terminals.

3. The network system according to claim 1 wherein:

said test server comprises:

terminal communication means for communicating with said terminals;

response time measuring means for measuring a response time from when a message is transmitted to each of said terminals until a response is returned from each of said terminals, and time setting command transmitting means for transmitting a time setting command to each of said terminals according to the measured response time; and each of said terminals comprises:

real time responding means for immediately returning a response to a message from said test server to said test server, time setting command receiving means for receiving a time setting command transmitted from said test server, and time setting means for setting time for said terminals according to the received time setting command, thereby synchronizing said terminals with said test server and with each other.

4. The network system according to claim 1 wherein:

said test server comprises program transmitting means for transmitting a new data base access program for switching a data base access program in said terminals to said terminals; and each of said terminals comprises program receiving means for receiving a new data base access program transmitted from said test server, and program changing means for switching a data base access program in each of said terminals to the received new data base access program.

5. The network system according to claim 1 wherein:

said command transmitting means in said test server transmits a measurement start command, including a measurement start command execution time, to each of said terminals, said command receiving means in each of said terminals receives the measurement start command transmitted from said test server, said command storage means stores the received measurement start command, said access executing means reads a data base access command from said command storage means according to the data base access command execution time written in the data base access command measured according to the measurement start command execution time as a reference and transmits the data base access command to said target servers.

6. The network system according to claim 1 comprising connecting means for ensuring connection between said terminals and said test server when communications occur between said test server and said terminals.

7. The network system according to claim 1 comprising connection control means for ensuring connection between said test server and said terminals during communication and for disconnecting said test server from said terminals when communication is absent.

8. The network system according to claim 1 wherein after receiving the data base access command signal, each of said terminals remains in a standby state during which the data base access command is not written to said target servers until the data base access command execution time is reached and, after the data base access command execution time is reached, each terminal writes the data base access command to said target servers.

9. A network system comprising:

a wide area network;

a plurality of target servers as objects for monitoring and connected to said wide area network;

a plurality of terminals connected to said wide area network for accessing and monitoring performance of said target servers; and a test server connected to said wide area network for transmitting, to said terminals commands for testing said target servers, wherein:

said test server comprises:

command transmitting means for transmitting a data base access command for said target servers to said terminals, schedule transmitting means for transmitting a schedule signal including a data base access command execution time, performance evaluation data receiving means for receiving performance evaluation data for said target servers, transmitted from said terminals, and first performance evaluation data storage means for storing performance evaluation data;

each of said terminals comprises:

command receiving means for receiving a data base access command transmitted from said test server, command storage means for storing the received data base access command, schedule receiving means for receiving a schedule signal transmitted from said test server, schedule storage means for storing the received schedule signal, access executing means for reading a data base access command from said command storage means according to the data base access command execution time in the schedule signal and transmitting the data base access command to said target servers, access result receiving means for receiving a result of access corresponding to the data base access command transmitted from said target servers, response time measuring means for measuring a response time from transmission of a data base access command to said target servers until reception of a result of access transmitted from said target servers, second performance data storage means for storing performance evaluation data including a result of access received by said access result receiving means and a response time measured by said response time measuring means, command execution end determining means for determining whether all data base access commands have been executed, and performance evaluation data transmitting means for reading the performance evaluation data from said second performance evaluation data storage means when all data base access commands have been executed and transmitting the performance evaluation data to said test server when all of the data base access commands from all of the said terminals have been executed by said target servers and all of the performance evaluation data has been received by said terminals; and each of said target servers includes an access result transmitting means for transmitting a result of access corresponding to the data base access command transmitted from said terminals to each of said terminals.

10. The network system according to claim 9 wherein:

said command transmitting means in said test server transmits to said terminals a performance evaluation data transmission command including a performance evaluation data transmission command execution time, said command receiving means in said terminal receives the performance evaluation data transmission command transmitted from said test server, said command storage means stores the received performance evaluation data transmission command, said performance evaluation data transmitting means for said terminals reads performance evaluation data from said second performance evaluation data storage means according the performance evaluation data transmission command execution time in the performance evaluation data transmission command and transmits the performance evaluation data to said test server after all of the data base access commands from all of the terminals have been executed by the target servers and all performance of the performance evaluation has been received by said terminals.

11. The network system according to claim 9 wherein:

said test server comprises:

terminal communication means for communicating with said terminals;

response time measuring means for measuring a response time when a message is transmitted to each of said terminals until a response is returned from each of said terminals, and time setting command transmitting means for transmitting a time setting command to each of said terminals according to the measured response time; and each of said terminals comprises:

real time responding means for immediately returning a response to a message from said test server to said test server, time setting command receiving means for receiving a time setting command transmitted from said test server, and time setting means for setting time for said terminals according to the received time setting command, thereby synchronizing said terminals with said test server and with each other.

12. The network system according to claim 9 wherein:

said test server comprises program transmitting means for transmitting a new data base access program for switching a data base access program in said terminals to said terminals; and each of said terminals comprises program receiving means for receiving a new data base access program transmitted from said test server, and program changing means for switching a data base access program in each of said terminals to the received new data base access program.

13. The network system according to claim 9 wherein:

said command transmitting means in said test server transmits a measurement start command, including a measurement start command execution time, to said terminals, said command receiving means in said terminals receives the measurement start command transmitted from said test server, said command storage means stores the received measurement start command, said access executing means reads a data base access command from said command storage means according to the data base access command execution time written in the data base access command measured according to the measurement start command execution time as a reference and transmits the data base access command to said target servers.

14. The network system according to claim 9 comprising connecting means for ensuring connection between said terminals and said test server when communications occur between said test server and said terminals.

15. The network system according to claim 9 comprising connection control means for ensuring connection between said test server and said terminals during communication and for disconnecting said test server from said terminals when communication is absent.

16. The network system according to claim 9 wherein after receiving the data base access command, each of said terminals remains in a standby state during which the data base access command is not written to said target servers until the data base access command execution time is reached and, after the data base access command execution time is reached, each terminal writes the data base access command to said target servers.

\* \* \* \* \*